(12) United States Patent
Serra

(10) Patent No.: US 6,250,739 B1
(45) Date of Patent: Jun. 26, 2001

(54) BIDIRECTIONAL COLOR PRINTMODES WITH SEMISTAGGERED SWATHS TO MINIMIZE HUE SHIFT AND OTHER ARTIFACTS

(75) Inventor: Josep Maria Serra, Barcelona (ES)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/810,747

(22) Filed: Mar. 4, 1997

(51) Int. Cl.⁷ ........................................................ B41J 2/21
(52) U.S. Cl. ................................................ 347/43; 347/41
(58) Field of Search .................................. 347/41, 43, 9, 347/12, 15; 400/323

(56) References Cited

U.S. PATENT DOCUMENTS

| | | | |
|---|---|---|---|
| 4,540,996 | * 9/1985 | Saito | 347/43 |
| 4,553,867 | * 11/1985 | Nakai | 400/323 |
| 4,631,548 | * 12/1986 | Milbrandt | 347/43 |
| 4,748,453 | * 5/1988 | Lin et al. | 347/43 |
| 4,967,203 | * 10/1990 | Doan et al. | 347/41 |
| 5,032,851 | * 7/1991 | Yoshimura | 347/15 |
| 5,044,796 | * 9/1991 | Lund | 347/43 |
| 5,359,355 | * 10/1994 | Nagoshi et al. | 347/9 |
| 5,422,666 | * 6/1995 | Koyama | 347/43 |
| 5,583,550 | * 12/1996 | Hickman et al. | 347/41 |
| 5,633,663 | * 5/1997 | Matsubara et al. | 347/41 |
| 5,844,585 | * 12/1998 | Kurashima et al. | 347/43 |

FOREIGN PATENT DOCUMENTS 60-199662  * 10/1985  (JP) ........................................ 347/43

* cited by examiner

Primary Examiner—N. Le
Assistant Examiner—Lamson D. Nguyen
(74) Attorney, Agent, or Firm—Ashen & Lippman

(57) ABSTRACT

Bidirectional scanning printheads discharge color-ink drops at ultrahigh resolution while scanning in each direction, to form color swaths on a print medium. The heads are at least partially aligned with respect to the longitudinal axis of the medium, so that the swaths at least partly overlap in that direction. An advance mechanism intermittently steps the print medium longitudinally, to enable displacement of successive swaths. A control system alternates (1) one full reciprocation of the heads, to discharge drops while scanning each way across the medium, with (2) each step of the advance mechanism. Preferably the heads print, while scanning each way, a respective generally fixed nonzero fraction of the total amount of each secondary color to be printed. In this way the overall appearance of each secondary is essentially consistent and partway between two appearances respectively produced by scanning two ways. This invention avoids the long-printzone drawbacks associated with full-height-staggered heads. Preferably the fractions for all the swaths are about equal, so that the consistent appearance for each secondary is essentially the average of two appearances respectively produced by scanning two ways. Various printmasks complete each swath in eight passes with four print-medium advances, or four passes and two advances, or two and one—in each case printing in every pass.

20 Claims, 12 Drawing Sheets

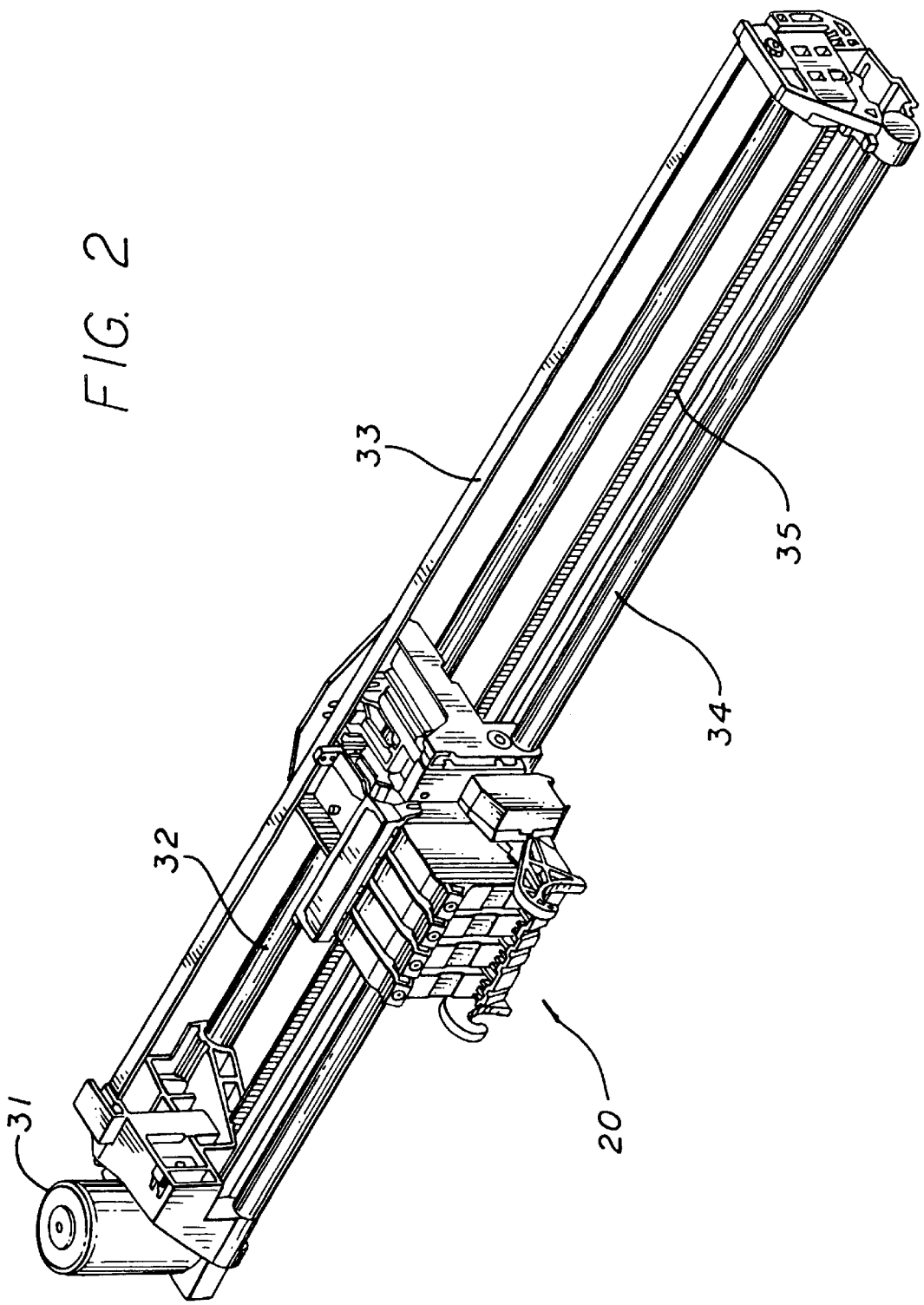

BIDIRECTIONAL COLOR PRINTMODES WITH SEMISTAGGERED SWATHS TO MINIMIZE HUE SHIFT AND OTHER ARTIFACTS

RELATED PATENT DOCUMENTS

Closely related documents include coowned U.S. Pat. Nos. 4,963,882 entitled "PRINTING OF PIXEL LOCATIONS BY AN INK JET PRINTER USING MULTIPLE NOZZLES FOR EACH PIXEL OR PIXEL ROW", 4,965,593 entitled "PRINT QUALITY OF DOT PRINTERS", 5,555,006 entitled "INKJET PRINTING: MASK-ROTATION-ONLY AT PAGE EXTREMES; MULTIPASS MODES FOR QUALITY AND THROUGHPUT ON PLASTIC MEDIA", and 5,561,449, entitled "POSITION LEADING, DELAY, & TIMING UNCERTAINTY TO IMPROVE POSITION & QUALITY IN BIDIRECTIONAL INKJET PRINTING"; as well as U. S. patent application Ser. No. 08/667,532, entitled "JITTER-FORM BACKGROUND CONTROL FOR MINIMIZING SPURIOUS GRAY CAST IN SCANNED IMAGES" and now issued as U.S. Pat. No. 5,859,928, U.S. Ser. No. 08/814,949 now issued as U.S. Pat. No. 6,082,849, entitled "RANDOM PRINTMASKS IN A MULTILEVEL INKJET PRINTER", Ser. No. 08/811,875 now issued as U.S. Pat. No. 6,142,605, entitled "BI-DIRECTIONAL COLOR PRINTING USING MULTIPASS PRINTMODES WITH SWATHALIGNED INKJET PRINTHEADS", and as Ser. No. 08/811,788 now filed Mar. 4, 1997 entitled "HIGH RESOLUTION INKJET PRINTING USING COLOR DROP PLACEMENT ON EVERY PIXEL ROW DURING A SINGLE PASS". All these documents in their entireties are hereby incorporated by reference into this document.

FIELD OF THE INVENTION

This invention relates generally to machines and procedures for printing ultrahigh-resolution color text or graphics on printing media such as paper, transparency stock, or other glossy media; and more particularly to a scanning inkjet machine and method that construct text or images from individual ink spots created on a printing medium, in a two-dimensional pixel array. The invention employs printmode techniques to optimize ultrahigh-resolution color image quality vs. operating time.

BACKGROUND OF THE INVENTION

A previous generation of printing machines and procedures has focused on mixed resolution. These systems most typically have employed about 24 pixels/mm (600 pixel dots per inch, or "dpi") in a carriage scan direction transverse to the printing medium and 12 pixels/mm (300 dpi) in the print-medium advance direction longitudinal to the printing medium—or 24 pixels/mm for black and 12 pixels/mm for chromatic colors, or relatively tall 12 mm (half-inch) pens for black ink and relatively short 8 mm (third-inch) pens for chromatic colors; or combinations of these and other operating-parameter mixtures.

These mixed-resolution systems have been of interest for obtaining effectively very high quality printing with a minimum of developmental delay. In the continuing highly competitive development of inkjet printer products, the mixed systems have served a very important role because of many difficult problems associated with attaining a full ultrahigh resolution—for example 24 pixel/mm pens, 12 mm tall, for all colorants in a color-printing system.

In the current generation of machines, interest has shifted to solving those many difficult problems. As will be seen, most of such difficulties have been recognized for many years, but tend to be aggravated in the ultra-high-resolution environment.

(a) Throughout and cost—In a sense many problems flow from these two considerations, since essentially all the problems would evaporate if it did not matter how slow or expensive a printer was. In practice, marketplace pressures have made it crucially important that a printer be both competitively fast (even when printing in a "quality" mode) and competitively economical.

(b) Firing frequency—Thus for example high throughput in combination with high resolution pushes the capability of economical inkjet nozzles to fire at a high enough repetition rate. An inkjet pen tends to be most stable in operation, and to work best for error hiding, at a low firing frequency.

Horizontal resolution of 24 pixels/mm if printed all in a single pass, however, would require a rather high firing frequency—in fact, for current-day technology, roughly twice the highest frequency of reliable operation in an economical pen. This figure may be expected to change with refinements in pens.

(c) Banding and pattern artifacts—These spurious image elements are well known in lower-performance printers, but like other problems can be even more troublesome in the newer generation of devices. It is known, for example, that some banding effects can be reduced by printing highly staggered (i. e., overlapping) swaths—but also that doing so reduces overall throughput proportionately. (A different kind of visible banding, associated with hue shifts, will be discussed below.) Hence, again, high throughput tends to run counter to elimination of banding, and this conflict is aggravated by a requirement for printing at resolution that is twice as fine.

As to pattern defects, the design of dither arrays is a logical culprit and has previously received a great deal of attention in this regard, and may be considered highly refined. Yet heretofore some patterning persists in high-resolution images printed under conditions which should yield the best possible image quality.

Theory suggests that no further advantage can be obtained through dither redesign, and that solutions must be sought elsewhere. Discussion of printmasks in a following subsection of this document will take up this theme again.

Generally speaking, tools for investigating this area heretofore have been inadequate.

(d) Color shift—One important approach to maximizing throughput is to print bidirectionally. In a bidirectional-printing system the pens print while the carriage is traveling in each of its two directions—i. e., across the printing medium, and back.

This technique is well known and successful for printing in monochrome. Workers skilled in this field have recognized, however, that for printing in color a hue shift, or more precisely a color shift, arises as between printing in the two directions.

The reason is that pens are traditionally arranged, physically, on their carriage in a specific sequence. Therefore if two or more of the pens fire while the carriage is moving in one particular direction the different ink colors are laid down one on top of another in a corresponding order—and while the carriage is moving in the opposite direction, in the opposite order.

Usually the first inkdrop of two superposed drops tends to dominate the resulting perceived color, so that for example laying down magenta on top of cyan produces a blue which is biased toward the cyan; whereas printing cyan on top of magenta typically yields a blue which emphasizes magenta. If successive separate swaths—or separately visible color bands, subswaths—are printed while the pen is thus traveling in each of two directions, respectively, the successive swaths or subswaths—therefore have noticeably different colors. Banding that results is often very conspicuous.

For this reason, previous artisans have striven to avoid printing of any superposition-formed secondary colors in more than one order, ever. Printers commercially available under the brand names Encad® and Lasermaster®, in particular, employ a tactic that employs brute force to avoid sequence changes: the pens are offset, with respect to the vertical direction, or in other words longitudinally along the printing medium.

They are offset by the full height of each nozzle array—posing, at the outset, significant problems of banding (see discussion following) as between colors. Furthermore, in consequence of the full-height-offset arrangement each of the trailing three pens must print over a color subswath formed in at least one previous scan—from one to three previous scans, depending upon which pen is under consideration.

This system advantageously maintains a fixed color sequence even in bidirectional printing. Use of full-height offset of the pens, however, makes a great sacrifice in other operating parameters. More specifically, the full-height staggered pens have a print zone that is four color bands (subswaths) tall.

Necessarily the overall product size in the direction of printing-medium advance is correspondingly greater, as are weight and cost. In addition the extended printzone is more awkward to manage in conjunction with a round (i. e. cylindrical) platen.

Furthermore in this system it is considerably more awkward to hold the printing medium consistently flat and without relative motion. Still further, the trailing pen is overprinting a pixel grid that has already been inked by three preceding pens, and in a heavy-color region of an image this means that a considerable amount of liquid has already been laid down on the page, and the page has had a significant time to deform in response.

Substantial and uncontrollable intercolor registration problems may be expected—particularly in view of the fact that this liquid-preloading effect is differential as between the several pens. In other words, it is present even for the second pen in the sequence, but suffered with progressively greater severity by the third and fourth.

The Encad/Lasermaster systems use bidirectional printing for at least the so-called "fast" and possibly "normal" printing modes, but not for the "best"-quality mode (which prints unidirectionally). Of course use of unidirectional printing as a best-quality printing mode incurs a throughput penalty of a factor as high as two. (Because the retrace may be at a faster, slew speed the factor may be less than two.) Such a penalty can be very significant.

Thus the art has failed to deal effectively with hue shifts—an impediment to fully exploiting the potential of bidirectional printing as a means of enhancing through-put.

(e) Liquid loading—Hue shift, however, is not the only problem that is associated with bidirectional printing. Another is microcoalescence. This may be regarded as a special case (particularly afflicting ultrahigh-resolution operation) of excessive inking with its historically known problems—which are summarized below.

In still another difficulty, the tails or satellites of secondary-color dots, pointing in opposite directions, can generate textural artifacts when the left-to-right order is reversed.

Excessive inking is a more-familiar problem. To achieve vivid colors in inkjet printing with aqueous inks, and to substantially fill the white space between addressable pixel locations, ample quantities of ink must be deposited. Doing so, however, requires subsequent removal of the water base—by evaporation (and, for some printing media, absorption) and this drying step can be unduly time consuming.

In addition, if a large amount of ink is put down all at substantially the same time, within each section of an image, related adverse bulk-colorant effects arise: so-called "bleed" of one color into another (particularly noticeable at color boundaries that should be sharp), "blocking" or offset of colorant in one printed image onto the back of an adjacent sheet with consequent sticking of the two sheets together (or of one sheet to pieces of the apparatus or to slipcovers used to protect the imaged sheet), and "cockle" or puckering of the printing medium. Various techniques are known for use together to moderate these adverse drying-time effects and bulk- or gross-colorant effects.

(f) Prior print-mode techniques—One useful and well-known technique is laying down in each pass of the pen only a fraction of the total ink required in each section of the image—so that any areas left white in each pass are filled in by one or more later passes. This tends to control bleed, blocking and cockle by reducing the amount of liquid that is all on the page at any given time, and also may facilitate shortening of drying time.

The specific partial-inking pattern employed in each pass, and the way in which these different patterns add up to a single fully inked image, is known as a "printmode". Heretofore artisans in this field have progressively devised ways to further and further separate the inking in each pass.

Larry W. Lin, in U.S. Pat No. 4,748,453—assigned to Xerox Corporation—taught use of a simple checkerboard pattern, which for its time was revolutionary in dividing inking for a single image region into two distinct complementary batches. Lin's system, however, maintains contact between pixels that are neighbors along diagonals and so fails to deal fully with the coalescence problem.

The above-mentioned U.S. Pat No. 4,965,593, which is in the name of Mark S. Hickman, teaches printing with ink-drops that are separated in every direction—in each printing pass—by at least one blank pixel. The Hickman technique, however, accomplishes this by using a nozzle spacing and firing frequency that are multiples of the pixel-grid spacing in the vertical and horizontal directions (i. e., the medium-advance and scan axes respectively).

Accordingly Hickman's system is not capable of printing on intervening lines, or in intervening columns, between the spaced-apart inkdrops of his system. This limitation significantly hinders overall throughput, since the opportunity to print such further intervening information in each pass is lost.

Moreover the Hickman system is less versatile. It forfeits the ability to print in the intervening lines and columns even with respect to printmodes in which overinking or coalescence problems are absent—such as, for example, a high-quality single-pass mode for printing black and white text.

The above-mentioned U.S. Pat No. 5,555,006, which is in the name of Lance Cleveland, teaches forming a print-mask as plural diagonal lines that are well separated from one another. Cleveland introduces printmodes that employ plural such masks, so that (unlike Hickman) he is able to fill in between printed elements in a complementary way.

It is certainly not intended to call into question the Cleveland teaching, which represents a very substantial advance in the art—over both Lin and Hickman. Cleveland's invention, however, in part is aimed at a different set of problems and therefore naturally has only limited impact on general overinking problems discussed here. In particular Cleveland seeks to minimize the conspicuousness of heater-induced deformation at the end of a page.

Thus even Cleveland's system maintains the drawback of inkdrop coalescence along diagonals and sometimes—since he calls for very steeply angled diagonal lines which in some segments are formed by adjacent vertical pixels—even along columns.

Another ironic development along these lines is that the attempts to solve liquid-loading problems through printmask tactics in some cases contribute to pattern artifacts. It will be noted that all the printmodes discussed above—those of Lin, Hickman, Cleveland, and other workers not mentioned—are all highly systematic and thus repetitive.

For example, some printmodes such as square or rectangular checkerboard-like patterns tend to create objectionable moire effects when frequencies or harmonics generated within the patterns are close to the frequencies or harmonics of interacting subsystems. Such interfering frequencies may arise in dithering subsystems sometimes used to help control the paper advance or the pen speed.

(g) Known technology of printmodes—One particularly simple way to divide up a desired amount of ink into more than one pen pass is the checkerboard pattern already mentioned: every other pixel location is printed on one pass, and then the blanks are filled in on the next pass.

To avoid horizontal "banding" problems (and sometimes minimize the moire patterns) discussed above, a printmode may be constructed so that the printing medium is advanced between each initial-swath scan of the pen and the corresponding fill-swath scan or scans. This can be done in such a way that each pen scan functions in part as an initial-swath scan (for one portion of the printing medium) and in part as a fill-swath scan.

This technique tends to distribute rather than accumulate print-mechanism error which is impossible or expensive to reduce. The result is to minimize the conspicuousness of—or, in simpler terms, to hide—the error at minimal cost.

The pattern used in printing each nozzle section is known as the "printmode mask" or "printmask", or sometimes just "mask". The term "printmode" is more general, usually encompassing a description of a mask—or several masks, used in a repeated sequence or so-called "rotation"—and the number of passes required to reach full density, and also the number of drops per pixel defining what is meant by "full density".

Operating parameters can be selected in such a way that, in effect, mask rotation occurs even though the pen pattern is consistent over the whole pen array and is never changed between passes. Figuratively speaking this can be regarded as "automatic" rotation or simply "autorotation".

As mentioned above, some of these techniques do help to control the objectionable patterning that arises from the periodic character of printmasks employed heretofore. Nevertheless, for the current new generation of ultrahigh-resolution color printers generally speaking the standards of printing quality are higher, and a more-advanced control of this problem is called for.

(h) Conclusion—Thus persistent problems of firing frequency, hue shift, liquid loading, and pattern artifacts, counterbalanced against pervasive concerns of throughput and cost, have continued to impede achievement of uniformly excellent inkjet printing. It may be added that certain combinations of these difficulties are more readily controlled on one and another printing medium; however, at least some of these problems remain significant with respect to all industrially important printing media.

Thus, as can be seen, important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is apparatus for printing a color image on a printing medium. The apparatus includes some means for scanning bidirectionally across such a printing medium, to discharge color-ink droplets at ultrahigh resolution while scanning in each direction.

For purposes of generality and breadth in describing the present invention, these means will be called the "bidirectional scanning printhead means" or sometimes more simply just the "scanning means" or "printhead means". Through their scanning and printing action, the scanning means form swaths of such a color image on the printing medium.

These means include plural inkjet printheads to print plural colors respectively. These plural printheads are mutually at least partially aligned with respect to the longitudinal direction of the printing medium. By virtue of this at least partial alignment, the plural printheads print respective color swaths which at least partially overlap in that longitudinal direction.

The apparatus also includes some means for intermittent operation to move such printing medium longitudinally. In this way these means enable displacement, when desired, of successive swaths along such medium. Again for breadth and generality these means will be called the "printing-medium advance means" or "medium advance means", or simply "advance means".

In addition the apparatus includes some means for alternating (1) one full reciprocation of the scanning printhead means, to discharge color-ink droplets while scanning in each direction across such printing medium and back, with (2) each operation of the printing-medium advance means. These means, again for like reasons, will be called the "control means".

The foregoing may constitute a description or definition of the first facet of the invention in its broadest or most general form. Even in this general form, however, it can be seen that this aspect of the invention significantly mitigates the difficulties left unresolved in the art.

In particular, it may first be noted that the present invention avoids the full-height-offset-pen arrangement discussed in the "BACKGROUND" section of this document. Accordingly this invention is not subject to the associated drawbacks of a long printzone—size, weight, cost, amenability to printing on a round platen, and print-medium flatness—or of differential liquid preloading, or susceptibility to intercolor banding.

While avoiding all these problems, the alternation of a full printing reciprocation with a single advance—an arrangement which can be called "semistaggered" swaths (or subswaths)—can be used to entirely resolve the hue-shift difficulties discussed earlier. It can also be used to eliminate or reduce certain pattern defects (sometimes seen as mottling) that arise from directional coalescence effects.

The invention accomplishes this by providing an equal number of passes in each direction—over each band or subswath of the print medium. In this way the invention tends to cancel out directional effects such as mentioned earlier, for example the visual artifacts that result from inkdrop satellites extending in different directions.

Although the invention as thus couched in its broadest form significantly advances the art of ultrahigh-resolution color inkdrop printing, nevertheless the invention is preferably practiced in conjunction with several additional features or characteristics that maximize the enjoyment of its benefits.

For instance preferably the control means include means for operating the printhead means to print, while scanning in each direction, a respective generally fixed nonzero fraction of the amount of each secondary color to be printed in a corresponding part of such image. In this case as will be understood the overall color appearance for each secondary color is substantially a consistent color appearance partway between two color appearances respectively produced by scanning in two directions.

It is further preferred that the respective generally fixed nonzero fractions for all the swaths be generally equal. In this case the consistent color appearance for each secondary color is substantially an average of two color appearances respectively produced by scanning in each of two directions.

Although it is preferable (from the standpoint of simplicity and convenience) to print fixed fractions of the secondary colors as described above, other ways of exploiting the semistaggered printmode can be substituted. For instance the control means may cause the printhead means to print, while scanning in a first direction, generally all spots of two color secondaries to be printed in each swath.

The printhead means also can be caused to print, while scanning in a second, opposite direction, generally all spots of a third color secondary, and of black, to be printed in each swath. In this way each secondary color is generally always deposited during scanning in a respective fixed, consistent direction, so that the overall color appearance for each secondary color is substantially consistent.

Still another approach is that the control means cause the printhead means to print, while scanning in a first direction, generally all inkdrops of two color primaries to be printed in each swath. The printhead means also print, while scanning in a second, opposite direction,. generally all inkdrops of a third color primary, and of black, to be printed in each swath.

As a result each primary color is generally always deposited during scanning in a respective fixed, consistent direction, and the order of primary-color deposition is generally always consistent. Therefore the overall color appearance for each secondary color, constructed by superposition of primary colors in consistent sequence, is substantially consistent.

Specific preferred printmodes in accordance with these preferences are described in a later section of this document.

A second aspect of the invention is an apparatus for printing a color image on a printing medium by applying ink of plural colors, including in some regions superposed inkdrops of plural colors. It is to be understood that the superposed inkdrop colors are susceptible to differences in resulting color appearance depending on order of deposition.

The apparatus includes bidirectional scanning print-head means generally as introduced above in relation to the first facet of the invention—but discharging (in at least some regions) superposed inkdrops of plural colors as just mentioned. Also as described above for the first aspect of the invention, the printhead means include at least partially aligned printheads producing color bands that are longitudinally at least partially overlapping.

The apparatus also includes printing-medium advance means generally as described for the first facet of the invention. In addition, the apparatus of this second aspect of the invention includes some means for minimizing color shifts due to order of deposition, while maximizing throughput.

The foregoing may represent a definition or description of the second aspect of the invention in its most general or broad form. Even in this form it can be seen that this aspect of the invention too significantly mitigate a difficulty left unresolved in the art—in particular that of color shifts associated with deposition order as described in the "BACKGROUND" section.

Nevertheless preferably the invention is practiced in conjunction with certain further characteristics or features that additionally enhance enjoyment of its benefits. For example preferably the minimizing-and-maximizing means comprise control means for alternating one full reciprocation of the scanning printhead means, across such printing medium and back, with each operation of the printing-medium advance means.

In a third basic aspect or facet, the invention is a method for printing a color image on a printing medium. The printing is performed using bidirectional scanning printhead means, printing-medium advance means, and control means.

The method includes the step of scanning the print-head means bidirectionally across the printing medium, to discharge color-ink droplets at ultrahigh resolution while scanning in each direction, and thereby form swaths of the color image on the printing medium. This scanning step includes printing plural bands of plural colors respectively, which plural bands are mutually at least partially overlapping with respect to the longitudinal direction of the printing medium.

A further step of the method is intermittent operation of the printing-medium advance means to semistagger the swaths.

The foregoing may constitute a description or definition of the invention in the third of its main aspects or facets. It has benefits closely related to those of the first two facets already discussed; and also is amenable to preferred variants closely related to those of the first two aspects of the invention.

All of the foregoing operational principles and advantages of the present invention will be more fully appreciated upon consideration of the following detailed description, with reference to the appended drawings, of which:

BRIEF DESCRIPTION OF THE DRAWINGS

FIG. 2 is a like view of a carriage and carriage-drive mechanism which is mounted within the case or cover of the FIG. 1 device;

FIG. 17 is a like diagram for a sixteen-by-five (columns by rows) printmask, for use in a ten-pass printmode;

FIG. 18 is a like diagram for a different sixteen-by-five printmask, for use in a five-pass printmode;

FIG. 19 is a like diagram for a sixteen-by-ten print-mask, for use in a six-pass, six-advance printmode;

FIG. 20 is a like diagram for a four-by-four print-mask, for use in a four-pass, four-advance printmode;

FIG. 21 is a like diagram for a four-by-four print-mask, for use in a four-pass, two-advance printmode;

FIG. 22 is a like diagram for a different four-by-four printmask, for use in a two-pass, single-advance printmode;

DETAILED DESCRIPTION OF THE PREFERRED EMBODIMENTS

1. BIDIRECTIONAL HIGH-RESOLUTION COLOR PRINTING WITH AT LEAST PARTIALLY ALIGNED PENS

A preferred embodiment of the present invention is the first commercial high-resolution color printer/plotter to print bidirectionally without full-height offset of the pens in the direction parallel to the printing-medium advance. As will be seen, the invention gains several important advantages by avoiding the extended printzone found in all bidirectionally operating high-resolution color printers heretofore.

More specifically, the present invention enables use of a mechanism that is more compact, light and economical—and more amenable to operation with a cylindrical platen of modest diameter. It is less subject to intercolor banding, differential distortion, and misregistration due to differential liquid preloading under the several pens.

Figure 1:
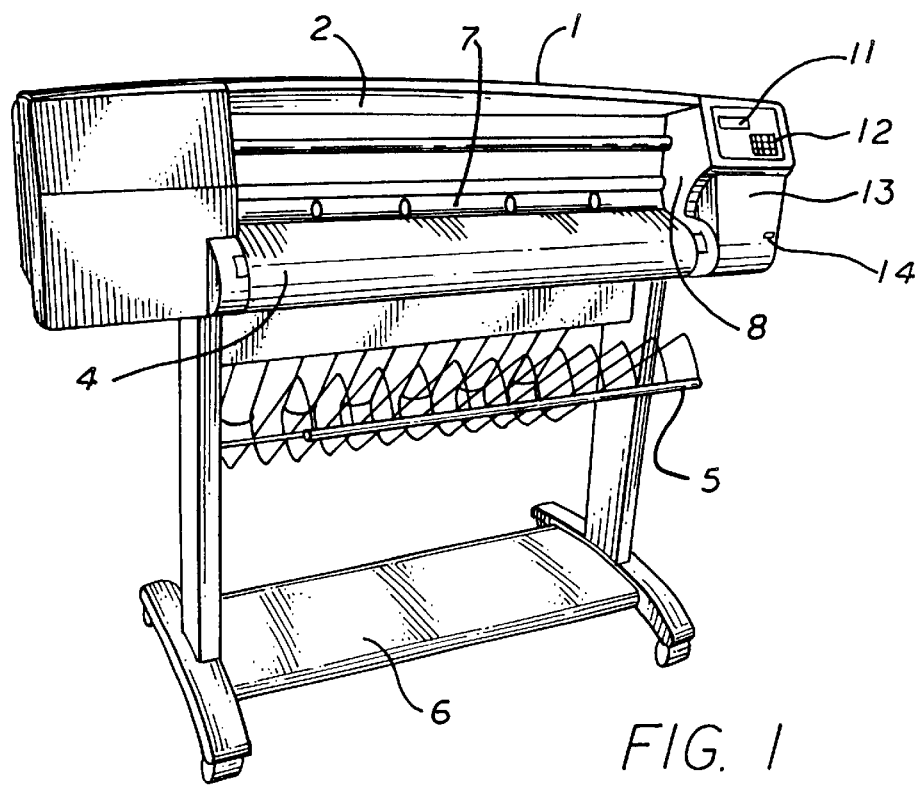
FIG. 1 is an isometric or perspective exterior view of a large-format printer-plotter which is a preferred embodiment of the present invention.

The printer/plotter includes a main case 1 (FIG. 1) with a window 2, and a left-hand pod 3 that encloses one end of the chassis. Within that pod are carriage-support and -drive mechanics and one end of the printing-medium advance mechanism, as well as a pen-refill station with supplemental ink cartridges.

The printer/plotter also includes a printing-medium roll cover 4, and a receiving bin 5 for lengths or sheets of printing medium on which images have been formed, and which have been ejected from the machine. A bottom brace and storage shelf 6 spans the legs which support the two ends of the case 1.

Figure 1A:
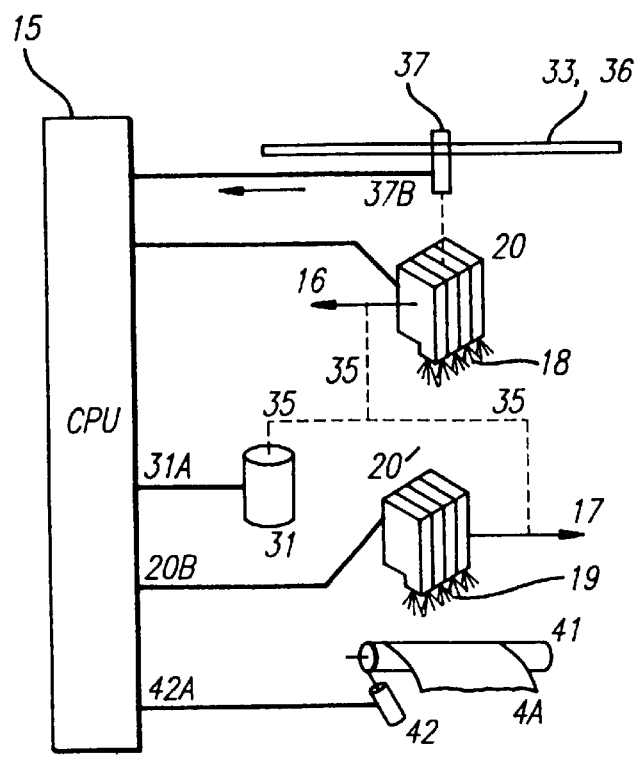
FIG. 1A is a highly schematic block diagram of the same product, particularly showing key signals flowing from and to a digital electronic central microprocessor, to effectuate printing while the pens travel in each of two opposite directions.

Just above the print-medium cover 4 is an entry slot 7 for receipt of continuous lengths of printing medium 4. Also included are a lever 8 for control of the gripping of the print medium by the machine. A front-panel display 11 and controls 12 are mounted in the skin of the right-hand pod 13. That pod encloses the right end of the carriage mechanics and of the medium advance mechanism, and also a printhead cleaning station. Near the bottom of the right-hand pod for readiest access is a standby switch 14. Within the case 1 and pods 3, 13 the carriage assembly 20 (FIG. 2) is driven in reciprocation by a motor 31—along dual support and guide rails 32, 34—through the intermediary of a drive belt 35. The motor 31 is under the control of signals 31A from a digital electronic microprocessor 17 (FIG. 1A). In a block diagrammatic showing, the carriage assembly is represented separately at 20 when traveling to the left 16 while discharging ink 18, and at 20' when traveling to the right 17 while discharging ink 19.

A very finely graduated encoder strip 33 is extended taut along the scanning path of the carriage assembly 20, 20', and read by an automatic optoelectronic sensor 37 to provide position and speed information 37B for the microprocessor 15. (In the block diagram all illustrated signals are flowing from left to right except the information 37B fed back from the sensor—as indicated by the associated leftward arrow.) The codestrip 33 thus enables formation of color inkdrops at ultrahigh precision (as mentioned earlier, typically 24 pixels/mm) during scanning of the carriage assembly 20 in each direction—i. e., either left to right (forward 20') or right to left (back 20).

Figure 3:
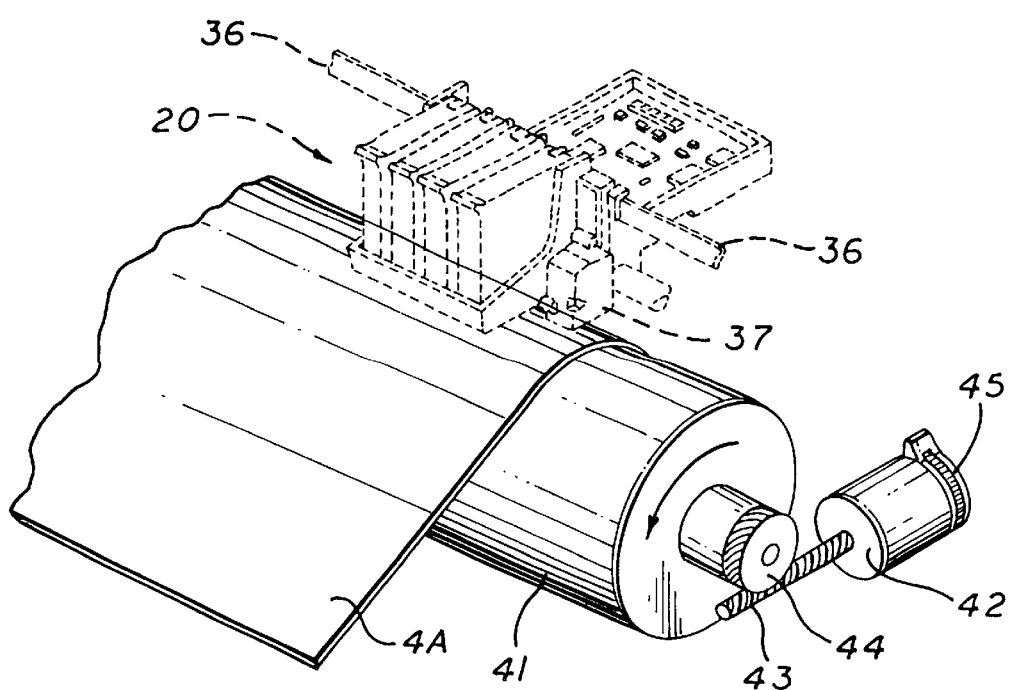
FIG. 3 is a like view of a printing-medium advance mechanism which is also mounted within the case or cover of the FIG. 1 device, in association with the carriage as indicated in the broken line in FIG. 3.

A currently preferred location for the encoder strip 33 is near the rear of the carriage tray (remote from the space into which a user's hands are inserted for servicing of the pen refill cartridges). Immediately behind the pens is another advantageous position for the strip 36 (FIG. 3). For either position, the sensor 37 is disposed with its optical beam passing through orifices or transparent portions of a scale formed in the strip.

A cylindrical platen 41—driven by a motor 42, worm 43 and worm gear 44 under control of signals 42A from the processor 15—rotates under the carriage-assembly 20 scan track to drive sheets or lengths of printing medium 4A in a medium-advance direction perpendicular to the scanning. Print medium 4A is thereby drawn out of the print-medium roll cover 4, passed under the pens on the carriage assembly 20, 20' to receive inkdrops 18, 19 for formation of a desired image, and ejected into the print-medium bin 5.

Figure 4:
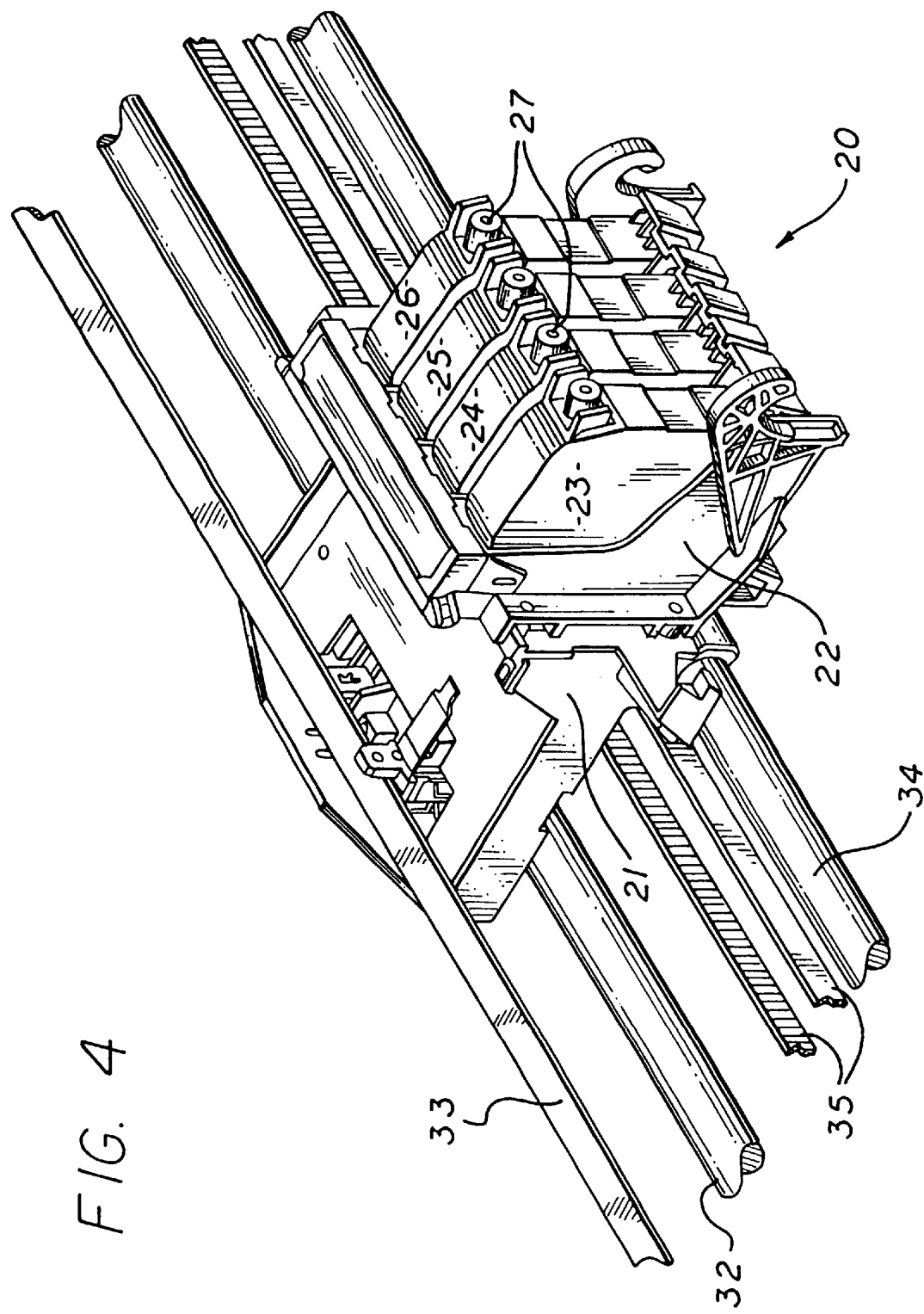
FIG. 4 is a like but more-detailed view of the FIG. 2 carriage, showing the printhead means or pens which it carries.

The carriage assembly 20, 20' includes a previously mentioned rear tray 21 (FIG. 4) carrying various electronics. It also includes bays 22 for preferably four pens 23–26 holding ink of four different colors respectively—preferably yellow in the leftmost pen 23, then cyan 24, magenta 25 and black 26.

Each of these pens, particularly in a large-format printer/plotter as shown, preferably includes a respective ink-refill valve 27. The pens, unlike those in earlier mixed-resolution printer systems, all are relatively long and all have nozzle spacing 29 (FIG. 5) equal to one-twelfth millimeter—along each of two parallel columns of nozzles. These two columns contain respectively the odd-numbered nozzles 1 to 299, and even-numbered nozzles 2 to 300.

The two columns, thus having a total of one hundred fifty nozzles each, are offset vertically by half the nozzle spacing, so that the effective pitch of each two-column nozzle array is approximately one-twenty-fourth millimeter. The natural resolution of the nozzle array in each pen is thereby made approximately twenty-four nozzles (yielding twenty-four pixels) per millimeter.

Figure 6:
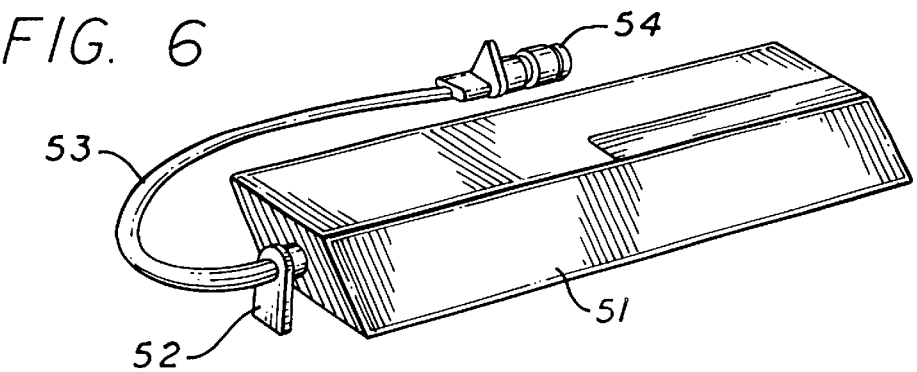
FIG. 6 is a perspective or isometric view of an ink-refill cartridge for use with the FIG. 4 and 5 pens.

For resupply of ink to each pen the system includes a refill cartridge 51 (FIG. 6), with a valve 52, umbilicus 53 and connector nipple 54. The latter mates with supply tubing within the printer/plotter refill station (in the left-hand pod 3).

Figure 7:
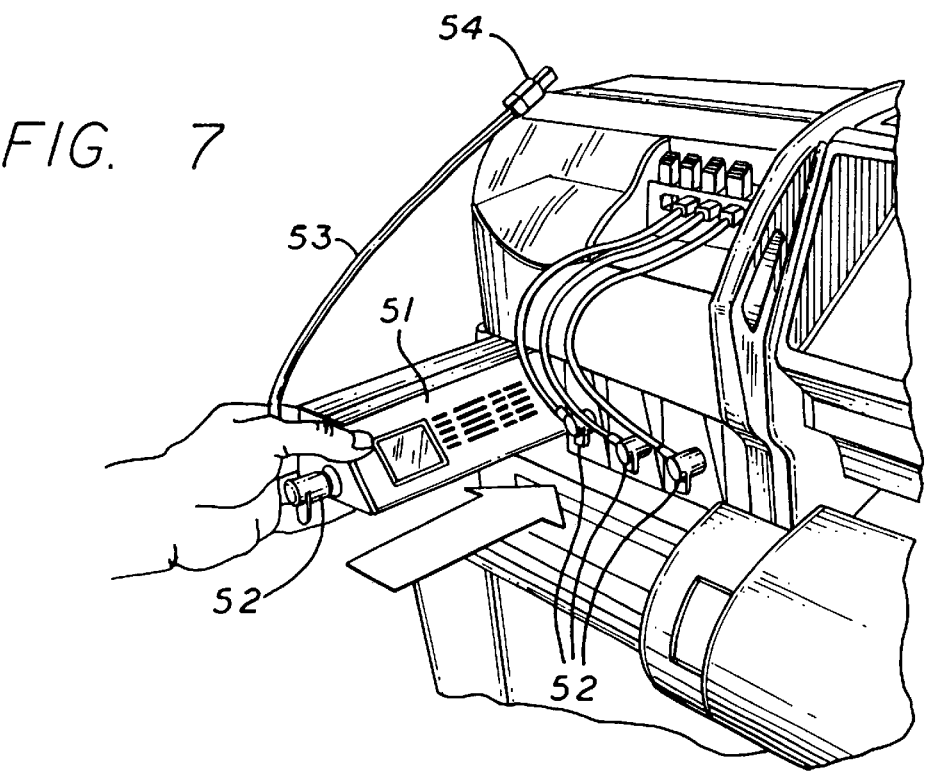
FIG. 7 is a like view showing several refill cartridges (for different ink colors) according to FIG. 6 in, or being installed in, a refill-cartridge station in the left end of the case in the FIG. 1 device.

Each supply tube in turn can complete the connection to the previously mentioned refill valve 27 on a corresponding one of the pens, when the carriage is halted at the refill station. A user manually inserts (FIG. 7) each refill cartridge 51 into the refill station as needed.

Figure 1B:
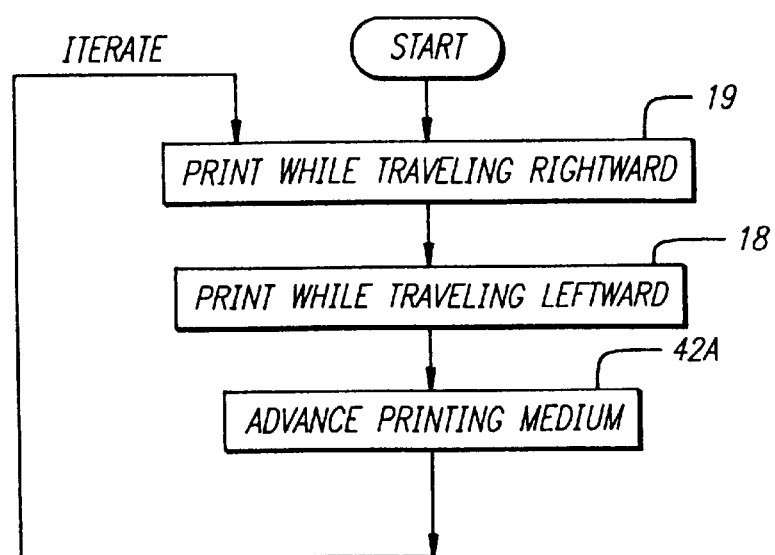
FIG. 1B is a flow chart showing alternation of a full reciprocation of the pens with each advance of the printing medium, in some printmodes of particular interest.

In the preferred embodiment of the invention, as illustrated in FIGS. 1A and 1B, all print modes are bidirectional. In other words, consecutive passes are printed 19, 18 while traveling in both directions, alternating left-to-right scans 17 with right-to-left 16.

Preferably black (or other monochrome) and color are treated identically as to speed and most other parameters. In the preferred embodiment the number of printhead nozzles used is always two hundred forty, out of the three hundred nozzles (FIG. 5) in the pens.

This arrangement allows, inter alia, for software/firmware adjustment of the effective firing height of the pen over a range of ±30 nozzles, at approximately 24 nozzles/mm, or ±30/24=±1¼ mm, without any mechanical motion of the pen along the print-medium advance direction. Alignment of the pens can be checked automatically, and corrected through use of the extra nozzles. As will be understood, the invention is amenable to use with a very great variety in the number of nozzles actually used. The system of the preferred embodiment has three printing speed/quality settings, which determine resolution, number of passes to complete inking of each swath (or more precisely each subswath), and carriage velocities as approximately:

|  | best quality | normal | fast |
|---|---|---|---|
| resolution (pixels/mm) | 24 | 12 | 12 |
| passes to complete swath | 8 or 10 | 4 or 6 | 2 |
| carriage velocity (cm/sec) | 51 or 63 ½ | 63 ½ | 63 ½. |

Figure 8:
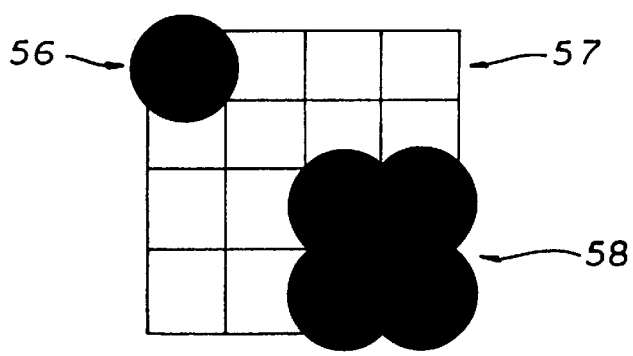
FIG 8 is a very highly enlarged schematic representation of two usage modes of the ultrahigh-resolution dot forming system of the present invention.

The varying choices indicated here are for correspondingly various media—for example carriage velocity is 63½ cm/sec, except that 51 cm/sec is used for best-quality printing on glossy stock. Resolution is the same in both horizontal and vertical directions, i. e. row and column spacings are the same so that pixels 57 (FIG. 8) are ¹/₂₄ mm square for all settings.

All printing, even the lower-resolution (12 pixel/mm) operation, is actually controlled and produced on the high-resolution (24-by-24 pixel/mm) grid. High-resolution printing, however, calculates the inking for each position in the grid independently, and implements that inking independently with one or more inkdrops 56 in each pixel.

Low-resolution printing instead calculates the inking only for every other position in the grid (along each of the perpendicular axes or dimensions) and implements that inking with one or more double-height, double-width compound inkdrop structures 58—each made up of a two-by-two assemblage of individual inkdrops. Since calculations are done for only half the rows and half the columns, the number of points calculated is just one quarter of all the points in the grid.

2. RANDOMIZED MASKS (a) General discussion—A printmask is a binary pattern that determines exactly which inkdrops are printed in a given pass or, to put the same thing in another way, which passes are used to print each pixel. In a printmode of a certain number of passes, each pass should print—of all the inkdrops to be printed—a fraction equal roughly to the reciprocal of that number.

As a practical matter, however, printmasks are designed to deal with the pixels to be addressed, rather than "printed". The difference resides in the details of an individual image which determine whether each particular pixel will be printed in one or another color, or left blank.

Thus a printmask is used to determine in which pass each pixel will be addressed, and the image as processed through various other rendition steps will determine whether each addressed pixel is actually printed, and if so with what color or colors. The printmask is used to, so to speak, "mix up" the nozzles used, as between passes, in such a way as to reduce undesirable visible printing artifacts discussed earlier—banding, etc.

Whereas prior attention has focused upon dither masks as the sources of patterning and other artifacts, the present invention attempts to isolate the contributions of printmasks to these problems—and to their solutions. In particular this invention pursues the elaboration of randomization as a paradigm in printmasks.

This pursuit is totally contrary to all the wisdom of the art heretofore, which has been uniformly devoted to printmask modules and design techniques that are entirely systematic and repetitive—precisely the opposite of random. Through this present contrarian approach a surprisingly high degree of success has been obtained.

(b) Masks according to the present invention—In the present preferred embodiment, a common printmask is used for each color (but that common mask is different for different modes). Moreover the common mask used for each color is synchronized, in the sense that each pixel is addressed in the same pass for all color planes.

As a very general rule, for preferred embodiments of the present invention two main kinds of masks may be recognized:

"one out of four" masks for most "normal" and "fast" print-quality settings—except average one out of six for some media, and "one out of eight" masks, for the "best quality" setting—except an average one out of ten for matte.

The phrase "one out of four" means that each nozzle is fired at one-quarter of the maximum permissible frequency, and analogously for "one out of eight".

Figure 9:
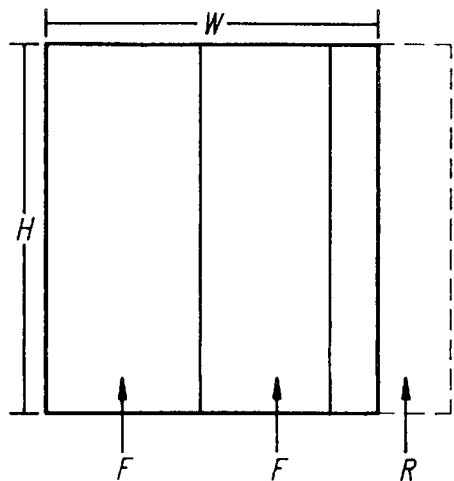
FIG. 9 is a schematic representation of generic printmask structures for use in the present invention.

Printmasks according to the present invention have been developed with a focus on single-field masks. A printmask "field" F (FIG. 9) is a mask unit, or building block, whose width measured in pixels is equal to the number of passes.

Thus a "single-field" printmask is one whose overall width W equals the number of passes. The width in pixels of a multiple-field mask can be integrally divisible by the width as so defined (i e., by the number of passes), or can have an integral remainder R, called a residual.

(c) Software design tool used in implementing the present invention—The basic strategy for creating single-field print masks is massive random iteration, using a simple algorithm implemented as a software design tool written in the "C" programming language and operating in an ordinary general-purpose computer—with the results subject to application of location rules. The location, or dot-placement, rules are taken up in a later subsection of this document.

Figure 10:
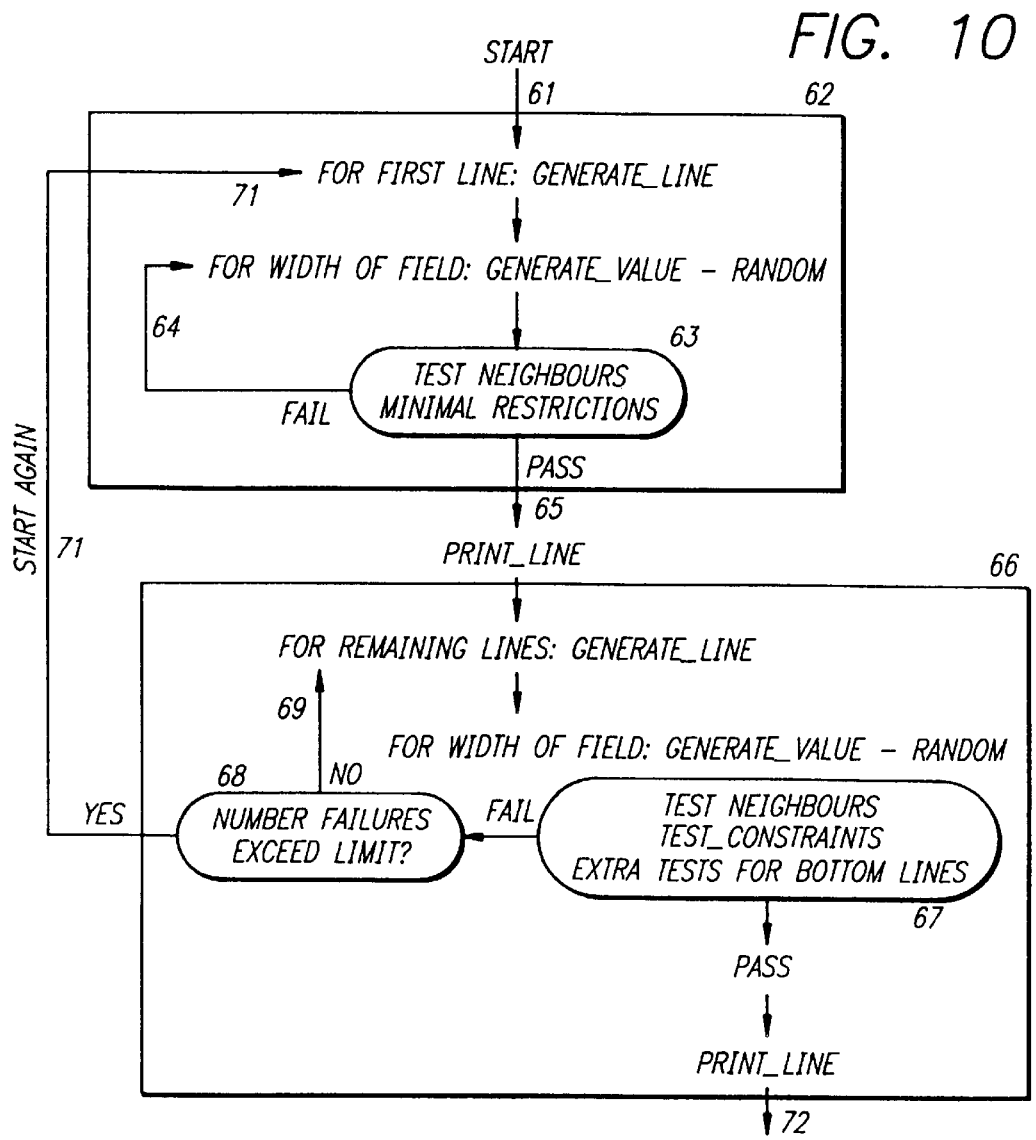
FIG. 10 is a flow chart showing operation of a printmask-generating utility or development tool, implementing certain aspects of the present invention.

The program begins with entry of a so-called "seed" 61 (FIG. 10) for use by the function "rando" of the "C" language. The program uses an internal printmask data structure containing width, height, data, current line, current value, and temporal neighbors to current value. Within the first module 62, the algorithm generates the first line of a printmask, one pixel value at a time, from the seed and the rando function, and the location rules. Eventually each "pixel value" will be interpreted as the pass number in which the corresponding pixel is addressed.

Thus the "Generate_Line" function within the first module 62 as seen consists of the "Generate_Value" function, using the rando function seeded from the command line as already mentioned, combined with a test 63 and a feedback path 64 in event of failure.

The line is tested against the location rules, either after completion of the entire line or after addition of each pixel value. Given that so far there are no other lines of data, the number of restrictions in the first-line block 62 is minimal. If the line (or individual value, depending on the testing protocol) is not valid, it is discarded and a new one is generated. This procedure is iterated until a valid first line has been created and can be printed out 65 for the designer's reference.

Next the program enters the main loop 66. Operation here closely parallels the first-line module 62, diverging in only three principal regards:

the testing 67 is more elaborate because of the greater number of constraints from already established lines, testing at the bottom line of the mask is particularly elaborate since it includes a test against the already-established top line, which will be vertically adjacent when the mask is stepped over the full pixel grid, and an extra test 68 is included to protect the system against cycling indefinitely when earlier-established values or lines pose an intractable selection problem for later values or lines.

As to the last-mentioned test, it permits recycling 69—still within the main loop 66—up to a predefined limiting number of failures, but then discards the entire candidate mask and follows the loop path 71 to start the whole procedure again. Such complete failures may seem catastrophic but actually are very inexpensive in machine time and almost insignificant in terms of designer time.

Ideally, the overall effect of the procedure described is to produce both row randomization and column randomization. In other words, it is desired that the pass used to print each row (considering, to take a simplified example, only pixels in a particular column) be selected at random; and that the row used to print each column also be selected at random.

As a practical matter the masks generated by this procedure may be denominated "randomiz" or "semirandom": they are developed through use of random numbers, but then subjected to exclusions which in many cases are quite rigorous. Naturally the finished array cannot be regarded as truly random, since a truly random array would have many coincidences that are forbidden in this environment.

During this preliminary generation stage the program is simply generating a very special numerical array, but naturally the array takes on solid physical meaning in the later usage stage—as the numerical pattern is applied directly to control electromechanical operation of the printer.

Figure 13:
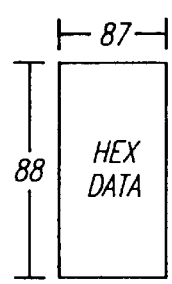
FIG. 13 is a diagram showing the elemental dimensions of a generic printmask.

The algorithmic procedure described has been used to make eight-by-fifteen-pixel, eight-pass masks as part of preferred embodiments of the present invention, and some smaller masks too as will be seen. It is very generally characteristic of the most successful masks, used for the "best quality" settings in ultrahigh-resolution bidirectional color printers/plotters, that they are much larger than printmasks employed heretofore. Some masks used in the preferred embodiment of the invention are sixteen pixels wide and one hundred ninety-two pixels tall—that is, the width 87 (FIG. 13) is sixteen pixels and the height 88 is one hundred ninety-two pixels.

Figures 19, 20, 21, 22:
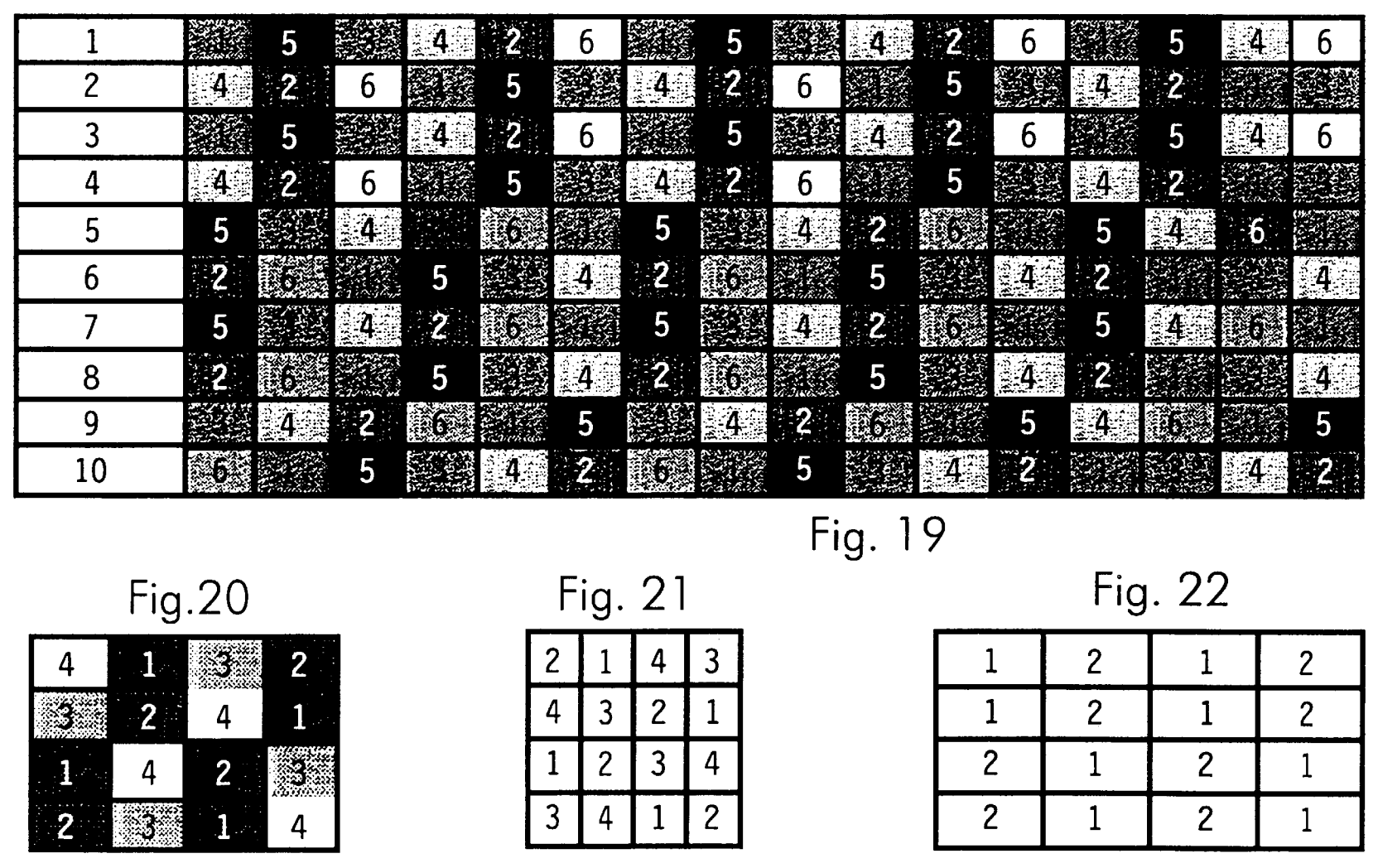

Very small masks, and particularly very simple ones such as that in FIG. 21, do continue to have a place in resolving fast-mode requirements for the relatively less temperamental printing media. Such masks are easy to work out by hand since the number of possibilities is quite small; accordingly the algorithmic approach has generally not been used for the very small masks.

(d) Designer participation to perfect the masking for each operating-parameter set—The objective of these mask-generation exercises is to elaborate randomized masking as a means for minimizing patterning artifacts and excess inking. The proof of this pudding thus cannot be obtained from the degree of randomization actually imparted to given masks, for the artifacts and overinking problems involved are-complex products of interactions between ink and media.

These interactions at the present writing are, with some exceptions, inordinately unpredictable. The physics of microcoalescence, the chemistry of inks and paper sizing, the biochemistry of some fiber-based print media and the electrostatics of others that are synthetic, all intertwine to produce a morass of variability in observable behaviors—which often seems to go beyond the merely bewildering to the truly temperamental. Accordingly the present invention relies heavily upon human observation, and human esthetic evaluation, to select actually useful solutions from those generated. The selection is based on actual trial of the printmasks, as applied in printing of both saturated and unsaturated images.

Massive trial and error is involved in finding the best: some masks are better for some combinations of medium and quality/speed requirements, other masks for other combinations. Through extensive testing the invention has settled upon three masks, for use at different print-quality settings, for each medium.

(e) Further refinement—As noted earlier, a randomized printmask according to the present invention may, as a finished product, be rather far from random. The relatively stringent location rules (see section 4 below) which are responsible for this particularity in selection are in part due to firing-frequency constraints or the strength of coalescence in modern inks.

In the foreseeable future with advances in the relevant electronic and chemical systems a relaxation of both these types of constraint may be expected. The result should be a greater degree of randomness in the printmask generating process—and more-random patterns in the actual finished-product masks.

Such developments will lead to continuingly improved print quality. Such quality improvements may in particular materialize in, for example, even images printed using the fast-mode settings.

Another area of contemplated extension of the present work is in the direction of multiple-field masks with no "residual" as previously defined; then multiple-field masks with a residual; and also customizable dot-placement rules. All such refinements are within the scope of the invention as defined by certain of the appended claims.

Figure 11:
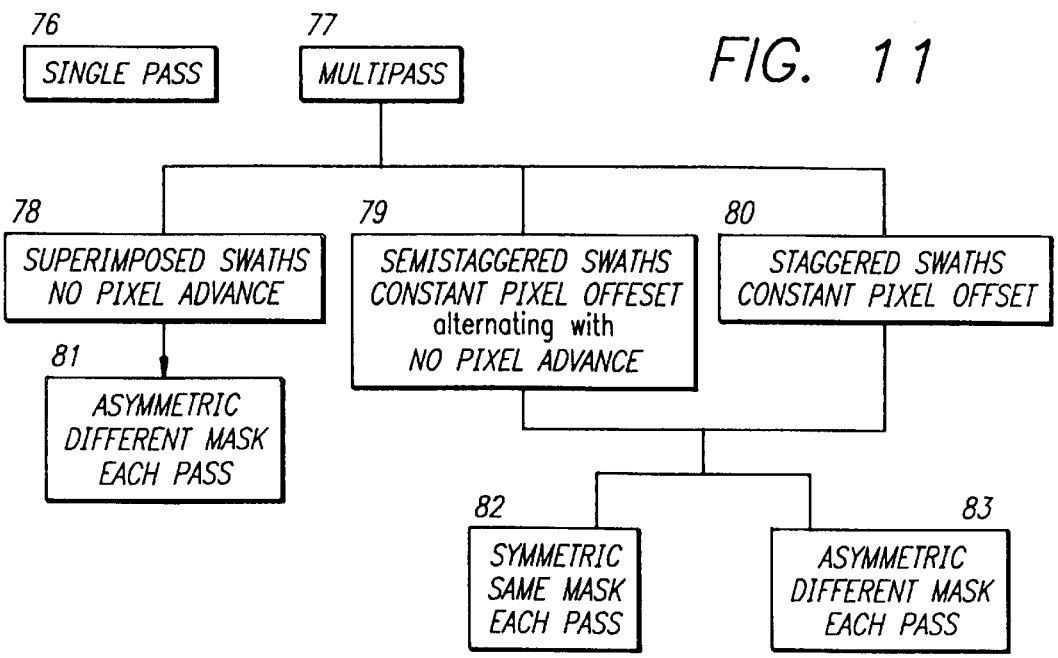
FIG. 11 is a diagram showing relationships between certain different types of printmodes and printmasks.

3. SEMISTAGGERED PRINTMODE (a) Terminology—For present purposes a "'swath" is a print region defined by the number of available and actually used nozzles of a pen and the actually used width of a printing medium. In a "single pass" print mode 76 (FIG. 11), all nozzles of a pen are fired to provide complete coverage for a given swath of image data.

Single-pass modes have the advantage of speed, but are not optimal in terms of coalescence or ink loading. Therefore swaths are often printed in multipass modes 77, with each swath containing only part of the inking needed to complete an image in some region of the print medium.

In this case only a fraction of all the nozzles fire in each pass, in each column of the pixel grid. Multipass color printing heretofore has created swaths that were either superimposed 78 or staggered 80.

In the case of superimposed swaths 78, a sequence of printmasks is used, one after another, all to print one common portion of the image. Only then is the page advanced—by the full swath height, since inking has been completed for the subject portion—and then the next superimposed-swath portion of the image is printed.

Given that all the swaths are printed one on top of another, each pass must be different or "asymmetric" to achieve complete coverage without duplication. This scheme tends to result in banding and is not highly valued for the current generation of printer products.

In the case of staggered swaths 80 a constant pixel offset is used to successively advance the pen during printing, through some fraction of the swath height. By virtue of this repetitive stepping of the printing medium, resulting printed swaths overlap in the direction of print-medium advance. Either symmetric masking 82 or asymmetric masking 83 may be adapted to staggered swaths 80—as explained at some length in the Cleveland Pat. No. 5,555,006 mentioned earlier.

Figure 12:
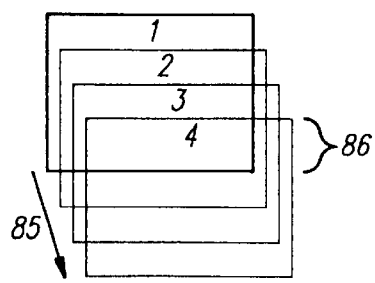
FIG. 12 is a diagram schematically showing relationships between swaths printed in a staggered or semistaggered printmode.

An example appears very schematically in FIG. 12. Here the vertical advance 85—by successive small off-sets 86—represents successive placements of swaths 1–4, by virtue of the printing-medium advance (in the opposite direction to the arrow 85).

(In this drawing the slight horizontal offsets between swath rectangles 1, 2, . . . are included only to make it easier to visualize the successive swath positions. In actual printing of course there is no such horizontal displacement.)

As in the case of superimposed swaths, each staggered swath contains only part of the inking needed to complete an image strip—but now, since the swaths are not all laid down in the same place, that "strip" is only a fraction of the area of any one of the swaths. Ignoring end effects at top and bottom of a page (or sheet, or length) of the medium, that elemental "strip" in which the number of passes needed for completion can be evaluated may be called a "subswath" or "band".

Thus for instance in FIG. 12 the only subswath that is actually shown as complete—i. e., with inking from the four swaths needed to complete its image elements—is the strip actually containing the numeral "4", adjacent to the offset marking "86". The top three subswaths (containing the numerals "1" through "3", as drawn) require earlier-formed swaths for completion; while the bottom three (containing no numerals) require later-formed swaths for completion.

The height 86 of a subswath or band is ordinarily equal to the offset distance of any two successive offset swaths—i. e., the vertical distance by which they are staggered. This offset, which again is normally a fraction of the overall swath height, is often expressed in pixels.

(b) A hybrid mode, novel to color printing—The present invention employs a bidirectional color printmode 79, incorporating a hybrid of the superimposed swaths 78 and staggered swaths 80 which may be called "semistaggered". In this system the pens print while traveling in each direction, and the printing medium is advanced as for staggered swaths—but not after every pass, rather instead only after every other pass.

More specifically, the medium advances 42A (FIG. 1B) after each full reciprocation 19, 18 of the pen carriage, and the distance of that advance is most commonly a fraction of the height of each used nozzle array (i. e., swath). As to successive passes between which the medium is not advanced, the operation is as for superimposed swaths; as to successive passes between which the medium is advanced, the operation is as for staggered swaths.

As explained earlier, semistaggering of swaths is readily exploited to substantially eliminate hue shifts and also eliminates or greatly minimizes certain directional types of coalescence artifacts. It is amenable to use with printmasks that minimize overinking problems.

Figure 14:
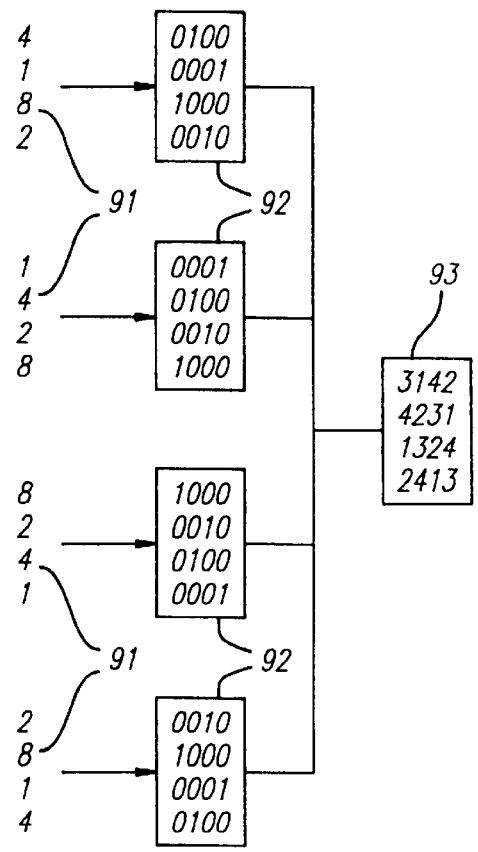
FIG. 14 is a diagram schematically showing relationships between three notations or conventions for representing an exemplary set of printmasks.

An example of multipass staggered-swath masking employed in preferred embodiments of the present invention may be represented in any of at least three equivalent notations 91, 92, 93 (FIG. 14). The most graphically plain notation 92 is essentially a representation of a part of the pixel grid, as addressed in each of four passes.

In that notation each pass is represented by a separate rectangle containing numerals (ones and zeroes) in rows and columns. Each row in each rectangle is part of a row in a particular portion of the overall pixel grid of the image, and each column in each rectangle is part of a column in the same portion of the overall pixel grid. In operation these rectangles are repeatedly stepped, so that the pattern is reused many times; however, in most preferred high-quality printmodes the mask is much larger than the example, so that considerably less repetition is present.

All four rectangles represent the same pixel-grid portions. Thus each numeral ("1" or "0") inside the rectangles represents what happens at a specific pixel in part of the overall pixel grid.

In these representations a "1" means that that particular pixel is addressed—i. e., printed if there is anything to print—during the pass represented by the rectangle under consideration.

Hence in the first pass the system addresses the pixel second from the left in the top row, the pixel at the far right in the second row, and that at the far left in the third row. It also addresses the pixel third from the left in the bottom row.

Exactly the same thing is shown by the numbers 91 at left of the diagram—i. e., the numerals "4", "1", "8" and "2"—which are simply hexadecimal (or decimal) encodings of the patterns within the rectangles read as binary numbers. In other words, "0100" binary is equal to "4" in hexadecimal or decimal notation, "0001" is equal to "1" in hex, "1000" to "8" in hex and "0010" to "2".

Again the same is shown by picking out the numerals "1" inside the single rectangle 93 at the right. Each such "1" means that the pixel position where the "1" appears is printed in pass number one—the topmost of the rectangles 92 already discussed.

Correspondingly the numerals "3142" across the top row of the rectangle 93 mean that the pixel positions in which these numerals appear are addressed in, respectively, passes number three, one, four and two. This system can be related to the central rectangles 92 by noting which of those rectangles 92 has a "1" in the same respective pixel positions: the third rectangle for the top-left pixel, first rectangle for the second pixel, etc.

Although as noted above the advance distance is ordinarily a fraction of the swath height, a two-pass/one-advance mode such as shown in FIG. 21 requires a full-height advance. In such a case successive swath pairs are abutted, leading to some banding; however, FIG. 21 does represent an optimal fast mode for certain media.

4. LOCATION RULES

As mentioned earlier, one ideal objective is row and column randomization, to minimize patterning while maintaining throughput. On the other hand, another important ideal objective is wide separation between inkdrops laid down in the same pass—and also in temporally nearby passes—to minimize puddling while maintaining throughput.

These objectives are inconsistent, since truly random pass assignments would occasionally produce nearer neighbors than consistent with good liquid management. What is desired is an optimum tradeoff between the two ideals. Most-highly preferred embodiments of the present invention follow these rules:

no immediate neighbors in any direction—horizontal, vertical or diagonal;

no more than one pixel in any row, within the entire width of the printmask;

no more than one pixel in any column, within the entire height of the printmask;

no immediate neighbors in any direction in the immediately preceding pass; and adherence to the no-immediate-neighbors rule across the seams of two vertically abutted masks, or horizontally abutted masks, or both.

Figure 15:
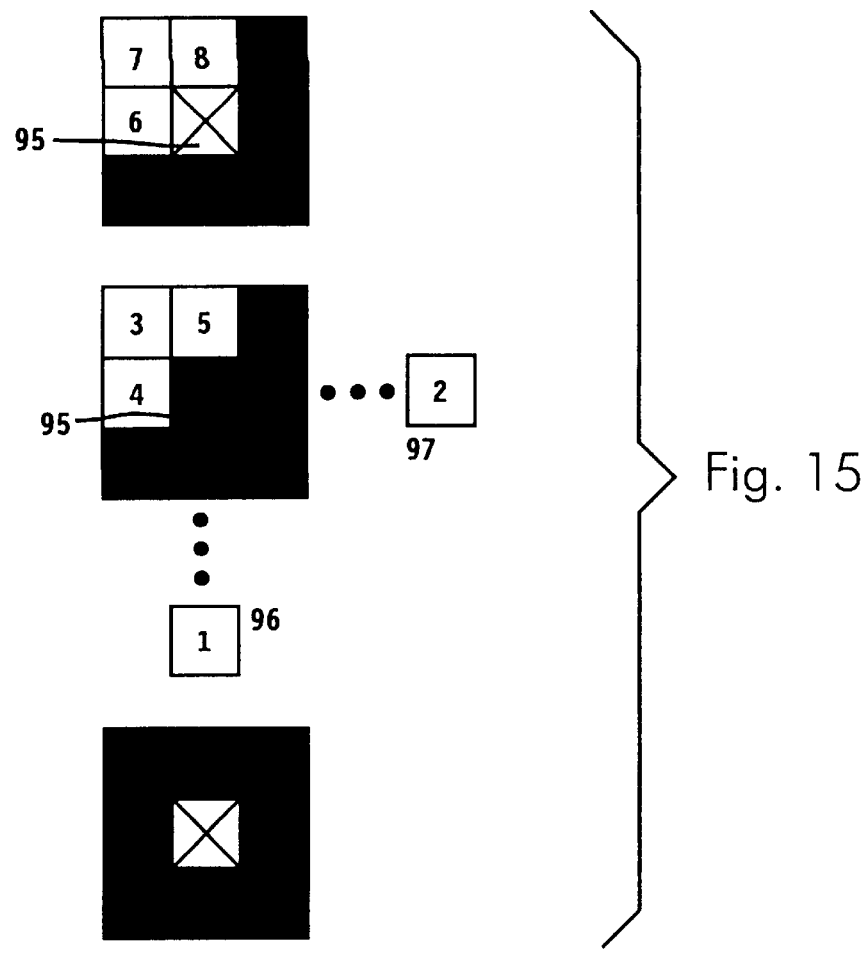
FIG 15 is a set of diagrams showing pixels among which relationships are to be tested in the practice of location-rule aspects of the present invention.

The first of these rules derives from well-known coalescence or puddling considerations, i. e. from concerns about over-inking. It focuses upon immediately adjacent horizontal neighbor 4 (FIG. 15)—where the center pixel 95 in the diagram represents a pixel currently under consideration—and also immediately adjacent vertical neighbor 5, and immediately adjacent diagonal neighbor 3.

The second rule actually arises from firing-frequency limitations, as mentioned earlier, but also of course helps to minimize overinking by spreading printed dots as much as possible. It focuses on "firing-frequency neighbors" 2.

For current pens the maximum firing frequency is 7.5 kHz, and a design objective is to stay at least a factor of two below that value. In most of the selected masks the effective frequency is four to eight times lower than that value, for a very fully effective margin of error.

The third rule is directed to overinking, and focuses on "vertical frequency" neighbors 1. The fourth rule is concerned with the same, but in regard to possibly-incompletely-dried inkdrops deposited in the immediately preceding pass—i. e., what may be called a "horizontal-temporal" neighbor 6, "vertical-temporal" neighbor 8, and "diagonal-temporal" neighbor 7.

The fifth and final rule is essentially the same as the first but focused upon the regions where adjoining masks come together.

Thus positions 1 and 2 are influenced primarily by pen parameters (firing capabilities), while the other positions are critical for ink and media artifacts.

Generally it has been possible to satisfy all the criteria stated, in eight-pass modes (i. e., printmasks with at least eight rows). Inadequate flexibility is available in six- and four-pass modes; hence some relaxation of the rules is required. For example in a fourpass mode the firing is one in four rather than one in eight.

5. ACTUALLY SELECTED MASKS

FIGS. 16 through 21 display the masks chosen from those randomly generated, after testing as described above. As mentioned earlier, some of the smaller masks were generated manually but still with attention to selection of the numbers at random.

Figure 16:
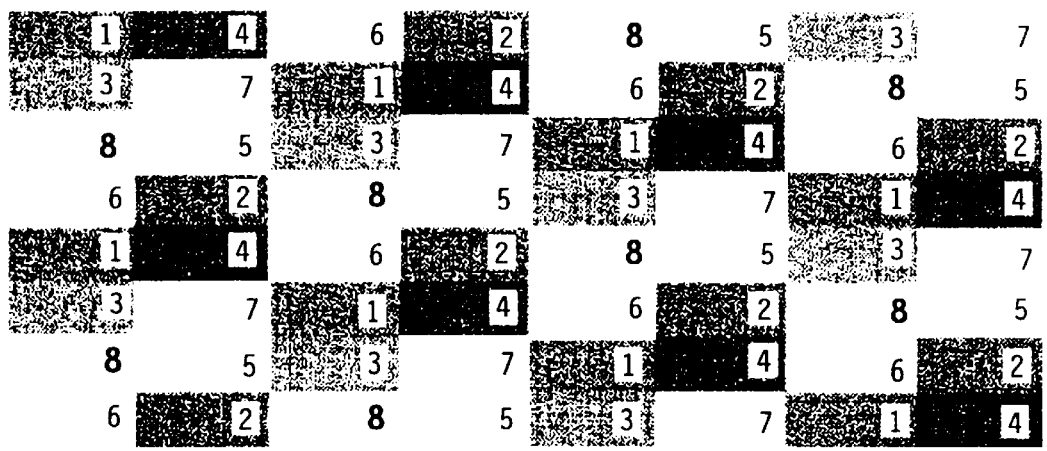
FIG. 16 is a diagram showing pass numbers for printing of each pixel in an eight-by-eight pixel printmask which is called a "knight" pattern—for use in eight-pass printmodes, with eight advances for glossy stock or four for vinyl.

The mask of FIG. 16 was found to produce best printed image quality for glossy stock, and also for a vinyl printing medium, and accordingly was selected for use at the "best" mode setting for those two media. It is familiarly called a "knight" printmask because the pixels assigned to each pass appear, relative to one another, two pixels over and one down—like the move of the piece called a "knight" in the game of chess.

Figures 17, 18:
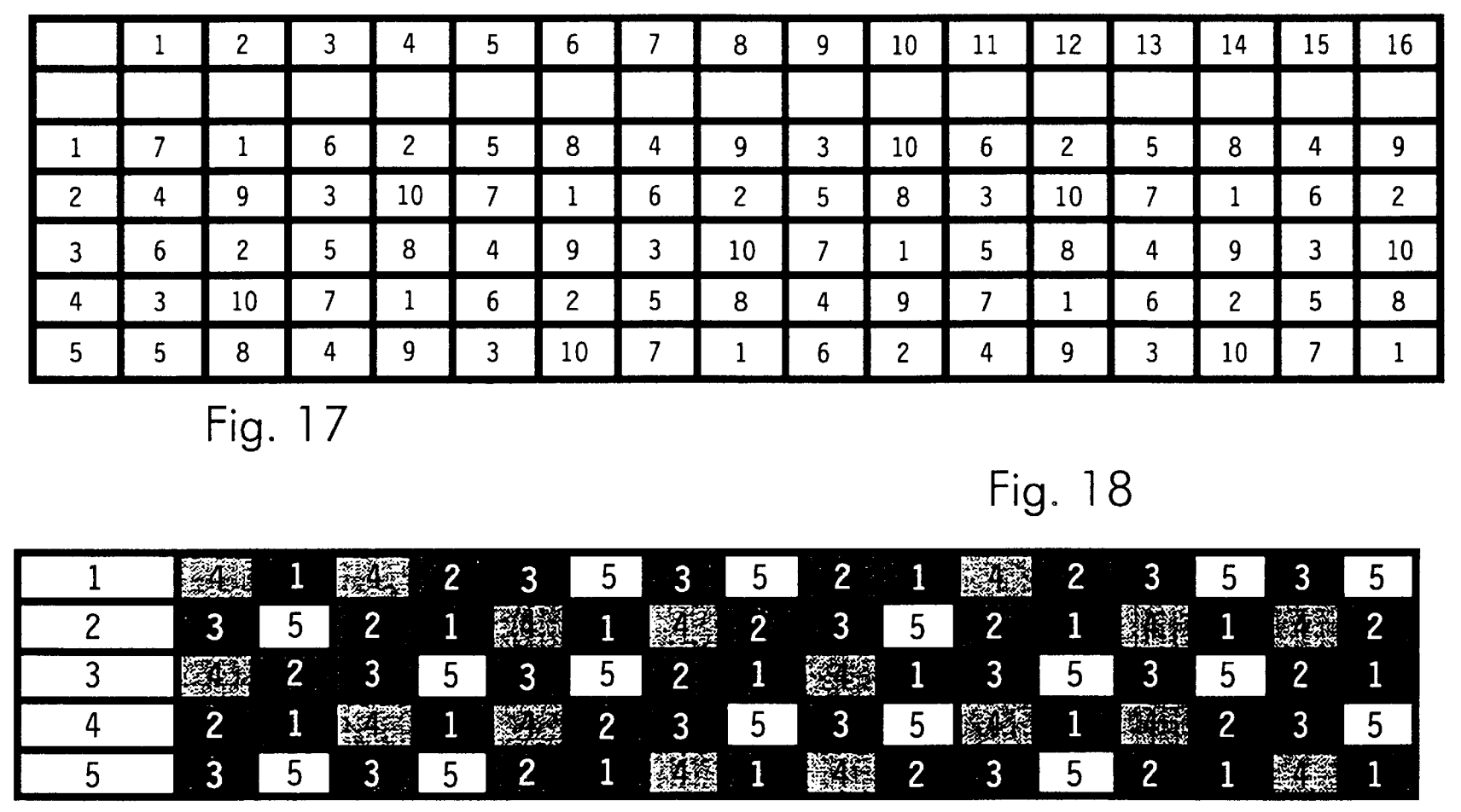

The FIG. 17 mask when tested produced best image quality on matte stock, and FIG. 18 best image quality when backlit—in other words, used for overhead projection or simply in a backlit display frame as in some types of advertising displays. It is a "two hundred percent of ink" mode, in which all normal inking is doubled. The mask of FIG. 17 is used at the "best" print-quality setting on matte, and FIG. 18 for backlit transparencies.

The FIG. 19 mask is used in the "normal" setting for glossy, heavy matte and vinyl. Inspection of the information shows clearly that several of the location rules are relaxed.

FIG. 20 shows a mask used for "normal" printing on backlit transparency media (at two hundred percent inking), and also for "fast" printing on glossy and vinyl stock—all at four passes and four advances. FIG. 21 is used for "normal" printing on matte, with four passes and two advances; and FIG. 22 is used at the "fast" setting on a matte medium, with two passes and one advance.

Figure 5:
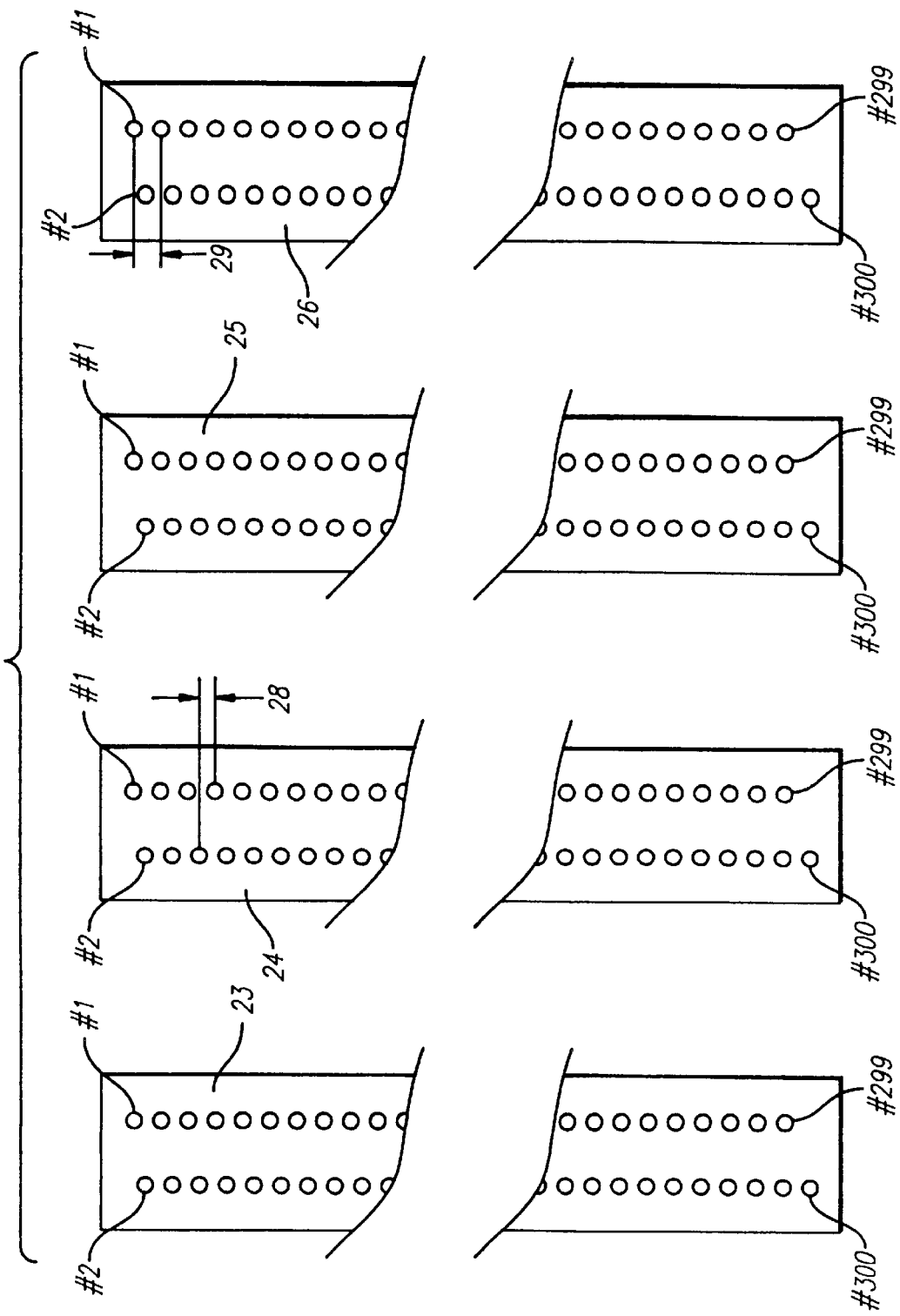
FIG. 5 is a bottom plan of the pens, showing their nozzle arrays.

The mask of FIG. 22 at a glance may seem trivial but actually is the product of considerable thought. As shown in FIG. 5, each printhead is made with—pursuant to convention—two rows of nozzles, the two rows being offset by half the nozzle spacing in each row. If a printmode happens to call for addressing, say, all odd-numbered nozzles in one pass and all even in the next pass, this seemingly arbitrary specification has a physical significance which may be unintended: in heavily inked regions, what will fire is in the first pass the entire left-hand column of nozzles and then, in the second, the entire right-hand column.

As a practical matter of constructional detail, pens are generally made with one common ink-supply channel supplying all the ink chambers in the left-hand row, and another distinct common channel supplying all the chambers in the right-hand row. Firing all odd or all even nozzles therefore selectively drains only one or the other supply channel, tending through liquid-flow impedance effects to aggravate any tendency of some nozzles to fire weakly. These may be, for example, the nozzles furthest from the channel source inlets—or those which happen to have been made with aperture sizes low-within-tolerance.

The mask of FIG. 22 calls for firing in a single pass (pass "1", for example) two vertically adjacent pixels in the upper right corner of the mask—which means two nozzles in immediate succession in the numbering sequence. These are, physically, one adjacent nozzle in each of the two columns. Thereby liquid loading is distributed equally between the two supply channels, not concentrated in one or the other. The same sharing of the hydraulic loading is seen whichever pass is considered.

This thinking was enough to include the FIG. 22 mask among those which should be subjected to comparative testing. In that testing it was found that the FIG. 22 mask provided slightly better image quality than its natural alternative, a plain checkerboard pattern. Accordingly the FIG. 22 mask has been adopted for use—but only on matte stock, for which coalescence problems are at a minimum.

6. OPERATION USING THE SELECTED MASKS

In operation the masks are simply called up automatically. They are selected by the combination of print-quality and print-medium settings which a user of the printer/plotter enters at the control panel 12, as verified by the display 11.

Each pass number in a particular cell of a mask is applied directly by the system central processor, to cause the carriage drive 31, medium-advance drive 42–44, encoder sensor 37, and pen nozzles (FIG. 5) with associated firing devices all to cooperate in implementing the pass-number indication. That is, they cooperate in such a way that all the pixels corresponding to that particular cell will be printed during the indicated pass—if there is anything to print in those pixels respectively.

Figure 23:
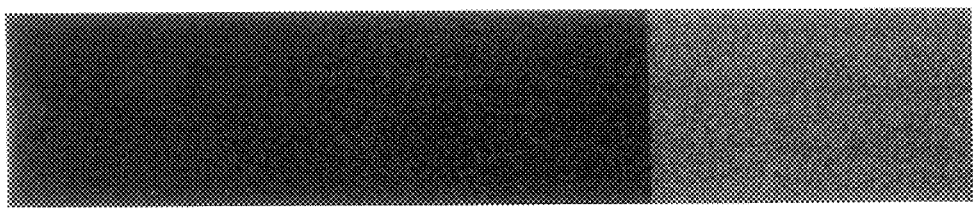
FIG. 23 is a sample of a gray ramp printed using the present invention—in a so-called "fast" printing mode.
Figure 24:
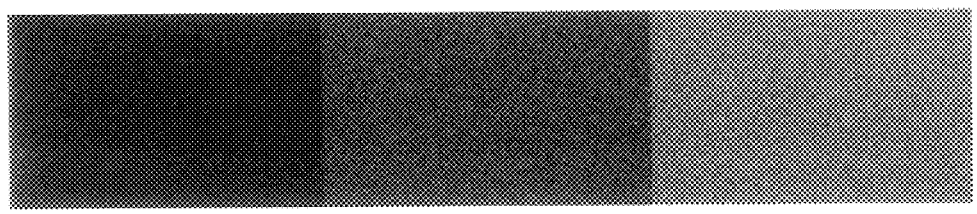
FIG. 24 is a like sample—but for a "normal" print-mode.
Figure 25:
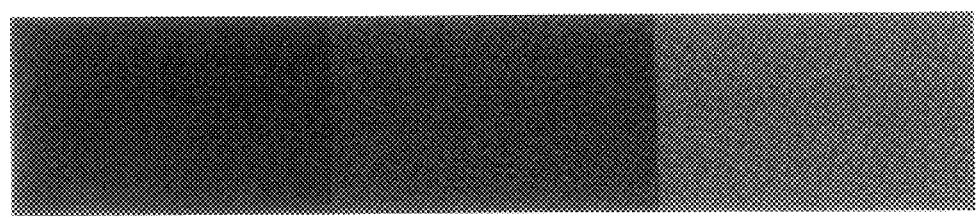
FIG. 25 is a like sample—but for a "best quality" mode.

The physical results may be seen directly in FIGS. 23 through 25, which should indicate clearly the relative quality levels available—with complementary speeds of printing—through use of the present invention.

In those of the accompanying claims which are directed to apparatus, a verbal convention has been adopted to make particularly distinct and clear which features mentioned in the claims are elements of the claimed invention and which features (first mentioned in the preamble) are instead recited as parts of the environment in which the invention exists and operates. Specifically, in referring back to parts of the environment, consistently the word "such" is used instead of the word "the" or "said". A common, unitary antecedent is intended: in other words, the term "such" is to be understood (as are "the" and "said") as a definite article, referring back to a particular element of the environment that is the same element whenever referred to.

The above disclosure is intended as merely exemplary, and not to limit the scope of the invention—which is to be determined by reference to the appended claims.

What is claimed is:

1. Apparatus for printing a color image on a printing medium; said apparatus comprising:
    bidirectional scanning printhead means for scanning bidirectionally across such printing medium, to discharge color-ink droplets at ultrahigh resolution while scanning in each direction, and thereby form swaths of such color image on such printing medium in rows and columns, said rows being spaced apart by a pixel-row spacing;
    said printhead means including plural inkjet print-heads to print plural colors respectively, which plural printheads are mutually at least partially aligned with respect to the longitudinal direction of the printing medium; whereby the plural printheads print respective color swaths which at least partially overlap in that longitudinal direction, and wherein each printhead has nozzles spaced apart at the same spacing as the pixel rows;
    printing-medium advance means for intermittent operation to move such printing medium longitudinally to enable displacement, when desired, of successive swaths along such medium; and
    control means for alternating (1) one full reciprocation of the scanning printhead means, to discharge color-ink droplets while scanning in each direction across such printing medium and back, with (2) each operation of the printing-medium advance means.

2. The apparatus of claim 1, wherein:
    the control means comprise means for operating the printhead means to print, while scanning in each direction, a respective generally fixed nonzero fraction of the amount of each secondary color to be printed in a corresponding part of such image; and
    the overall color appearance for each secondary color is substantially a consistent color appearance partway between two color appearances respectively produced by scanning in two directions.

3. The apparatus of claim 2, wherein:
    the respective generally fixed nonzero fractions for all the swaths are generally equal; and
    said consistent color appearance for each secondary color is substantially an average of two color appearances respectively produced by scanning in two directions.

4. The apparatus of claim 1, wherein;
    the control means comprise means for operating the printhead means to print:
        while scanning in a first direction, generally all spots of two color secondaries to be printed in each swath, and
        while scanning in a second, opposite direction, generally all spots of a third color secondary, and of black, to be printed in each swath; and
    each secondary color is generally always deposited during scanning in a respective fixed, consistent direction; and
    the overall color appearance for each secondary color is substantially consistent.

5. The apparatus of claim 1, wherein:
    the control means comprise means for operating the printhead means to print:
        while scanning in a first direction, generally all inkdrops of two color primaries to be printed in each swath, and
        while scanning in a second, opposite direction, generally all inkdrops of a third color primary, and of black, to be printed in each swath; and
    each primary color is generally always deposited during scanning in a respective fixed, consistent direction;
    the order of primary-color deposition is generally always consistent; and
    the overall color appearance for each secondary color, constructed by superposition of primary colors, is substantially consistent.

6. The apparatus of claim 1, wherein:
    the control means comprise means for operating the printhead means to complete each swath in eight passes, with printing in each pass, and with four printing-medium advances.

7. The apparatus of claim 6, wherein:
    the operating means provide best quality of printing on vinyl.

8. The apparatus of claim 7, wherein:

the operating means impose an eight-by-eight "knight"-pattern printmask.

9. The apparatus of claim 1, wherein:

the control means comprise means for operating the printhead means to complete each swath in four passes, with printing in each pass, and with two printing-medium advances.

10. The apparatus of claim 9, wherein:

the operating means provide normal quality of printing on matte stock.

11. The apparatus of claim 10, wherein:

the operating means impose a four-by-four printmask with the pattern:

| 2 | 1 | 4 | 3  |
|---|---|---|----|
| 4 | 3 | 2 | 1  |
| 1 | 2 | 3 | 4  |
| 3 | 4 | 1 | 2. |

12. The apparatus of claim 1, wherein:

the control means comprise means for operating the printhead means to complete each swath in two passes, with printing in each pass, and with one printing-medium advance.

13. The apparatus of claim 12, wherein:

the operating means provide fast printing on matte stock.

14. The apparatus of claim 13, wherein:

the operating means impose a four-by-four printmask with the pattern:

| 1 | 2 | 1 | 2  |
|---|---|---|----|
| 1 | 2 | 1 | 2  |
| 2 | 1 | 2 | 1  |
| 2 | 1 | 2 | 1. |

15. Apparatus for printing a color image on a printing medium by applying ink of plural colors, including in some regions superposed inkdrops of plural colors, said superposed inkdrop colors being susceptible to differences in resulting color appearance depending on order of deposition; said apparatus comprising:

bidirectional scanning printhead means for scanning bidirectionally across such printing medium to discharge color-ink droplets at ultrahigh resolution in pixel rows and columns while scanning in each direction, including in some regions superposed inkdrops of plural colors, said superposed inkdrop colors being susceptible to differences in resulting color appearance depending on order of deposition and said rows being spaced apart by a pixel-row spacing;

said printhead means including plural inkjet print-heads to print plural colors respectively, which plural printheads are mutually at least partially aligned with respect to the longitudinal direction of the printing medium; whereby the plural printheads print respective color bands which at least partially overlap in that longitudinal direction, and wherein each printhead has nozzles spaced apart at the same spacing as the pixel rows;

printing-medium advance means for intermittent operation to move such printing medium longitudinally to enable displacement, when desired, of successive swaths along such medium; and means for minimizing color shifts due to order of deposition, while maximizing throughput.

16. The apparatus of claim 15, wherein:

the minimizing-and-maximizing means comprise control means for alternating one full reciprocation of the scanning printhead means, across such printing medium and back, with each operation of the printing-medium advance means.

17. The apparatus of claim 16, wherein:

the control means comprise means for operating the printhead means to print, while scanning in each direction, a respective generally fixed nonzero fraction of the amount of each secondary color to be printed in a corresponding part of such image; and the overall color appearance for each secondary color is substantially a consistent color appearance partway between two color appearances respectively produced by scanning in two directions.

18. The apparatus of claim 16, wherein:

the control means impose a constraint, as stated below, in terms of a triad of control colors, said triad being either:

three color secondaries, or three color primaries;

the control means comprise means for operating the printhead means to print:

while scanning in a first direction, generally all spots of two colors of said triad to be printed in each swath, and while scanning in a second, opposite direction, generally all spots of a third color of said triad, and of black, to be printed in each swath; and each color of the triad is generally always deposited during scanning in a respective fixed, consistent direction; and the overall color appearance for each of the triad color is substantially consistent.

19. A method for printing a color image on a printing medium, using bidirectional scanning printhead means comprising plural printheads each with nozzles spaced apart at a nozzle spacing, printing-medium advance means, and control means; said method comprising the steps of:

scanning the printhead means bidirectionally across the printing medium, to discharge color-ink droplets at ultrahigh resolution while scanning in each direction, and thereby form swaths of the color image on the printing medium in a pixel grid of rows and columns, said rows being spaced apart by a pixel-row spacing equal to said nozzle spacing;

wherein said scanning step includes printing plural bands of plural colors respectively, which plural bands are mutually at least partially overlapping with respect to the longitudinal direction of the printing medium; and intermittent operation of the printing-medium advance means to semistagger the swaths.

20. The method of claim 19, wherein:

the scanning step comprises operating the printhead means to print, while scanning in each direction, a respective generally fixed nonzero fraction of each secondary color to be printed in a corresponding part of such image; and the overall color appearance for each pair of generally adjacent spots of each secondary color is substantially a consistent color appearance partway between two color appearances respectively produced by scanning in two directions.

* * * * *